(12) United States Patent
Garris

(10) Patent No.: US 6,434,943 B1
(45) Date of Patent: Aug. 20, 2002

(54) PRESSURE EXCHANGING COMPRESSOR-EXPANDER AND METHODS OF USE

(75) Inventor: Charles Alexander Garris, Vienna, VA (US)

(73) Assignee: George Washington University

( * ) Notice: Subject to any disclaimer, the term of this patent is extended or adjusted under 35 U.S.C. 154(b) by 0 days.

(21) Appl. No.: 09/679,053

(22) Filed: Oct. 3, 2000

(51) Int. Cl.[7] ............................................. F01K 25/06
(52) U.S. Cl. ............................ 60/649; 60/673; 417/178
(58) Field of Search ......................... 60/649, 670, 673; 417/178, 179, 180, 194

(56) References Cited

U.S. PATENT DOCUMENTS

| | | | |
|---|---|---|---|
| 2,623,474 A | 12/1952 | Friedmann | 103/271 |
| 2,852,915 A | 9/1958 | Jendrassik | 60/39.45 |
| 3,012,708 A | 12/1961 | Berchtold | 230/69 |
| 3,046,732 A | 7/1962 | Foa | 60/35.6 |
| 3,074,620 A | 1/1963 | Spalding | 230/69 |
| 3,216,649 A | 11/1965 | Foa | 230/1 |
| 3,361,336 A | 1/1968 | Foa | 417/225 |
| 3,719,434 A | 3/1973 | Eskeli | 417/78 |
| 4,239,155 A | 12/1980 | Foa | 239/265.17 |
| 4,249,382 A | 2/1981 | Evans | 60/605 |
| 4,460,545 A | 7/1984 | Jouffroy | 422/131 |
| 4,489,557 A | 12/1984 | Fawcett | 60/605 |
| 4,505,646 A | 3/1985 | Long | 417/172 |
| 4,865,518 A | 9/1989 | Foa | 417/54 |
| 4,956,973 A | 9/1990 | Fortnagel | 60/605 |
| 5,088,896 A | 2/1992 | Nielson | 417/77 |
| 5,131,229 A | 7/1992 | Kriegler | 60/605 |
| 5,248,566 A | 9/1993 | Kumar | 429/19 |
| 5,267,432 A | 12/1993 | Paxson | 60/39.45 |
| 5,284,123 A | 2/1994 | Dones | 123/559.2 |
| 5,373,707 A | 12/1994 | Ostersetzer | 62/401 |
| 5,379,736 A | 1/1995 | Anderson | 123/204 |
| 5,434,016 A | 7/1995 | Benz | 429/13 |
| 5,545,238 A | 8/1996 | Strasser | 429/17 |
| 5,645,950 A | 7/1997 | Benz | 429/13 |
| 5,647,221 A | 7/1997 | Garris | 62/116 |
| 5,820,353 A | 10/1998 | Beylich | 417/198 |
| 6,000,222 A | 12/1999 | Regnier | 60/605 |
| 6,062,028 A | 5/2000 | Arnold | 60/612 |
| 6,138,456 A | * 10/2000 | Garris | 60/649 |

\* cited by examiner

Primary Examiner—Hoang Nguyen

(57) ABSTRACT

A novel pressure-exchange compressor-expander is disclosed whereby a high energy primary fluid compresses a lower energy secondary fluid through direct fluid-fluid momentum exchange. The pressure-exchange compressor-expander utilizes non-steady flow principles and supersonic flow principles to obtain an ejector-compressor which can attain high adiabatic efficiencies while having a simplicity of construction, small size and weight, and the low manufacturing cost. This disclosure includes a fuel-cell pressurization system and humidity control system utilizing the pressure-exchange compressor-expander. The disclosure includes a novel turbo-charger for internal combustion engines incorporating exhaust gas recirculation capabilities. Further, an air-cycle heat pump suitable for aircraft applications is disclosed utilizing the pressure-exchange compressor-expander.

39 Claims, 23 Drawing Sheets

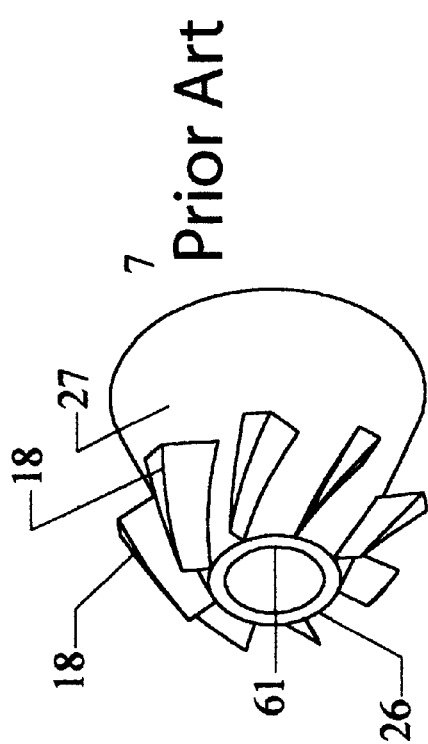
FIG. 6 Prior Art
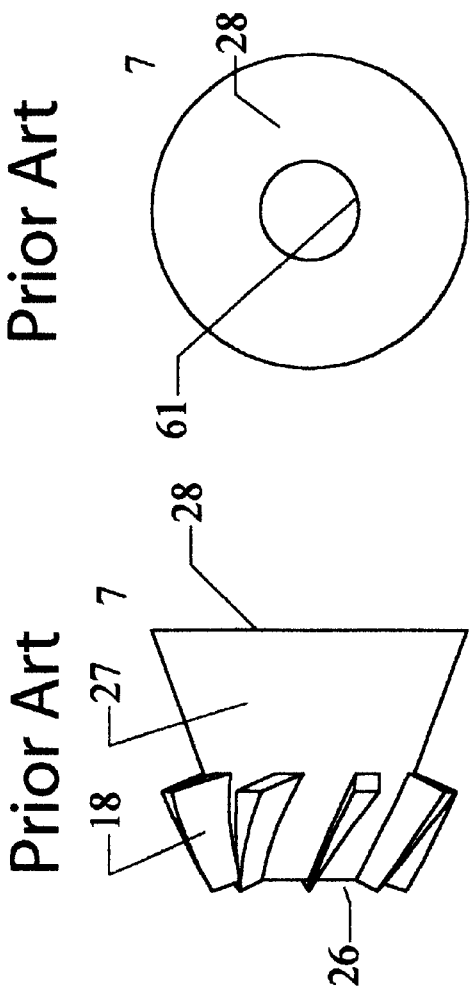
FIG. 4 Prior Art
FIG. 5 Prior Art
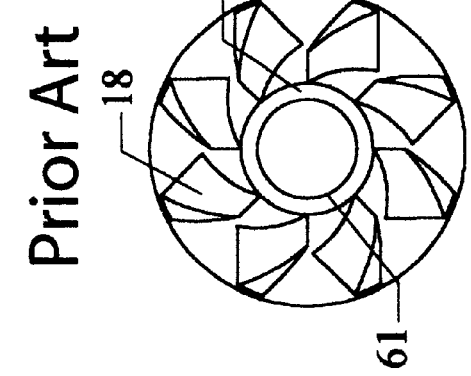
FIG. 3 Prior Art

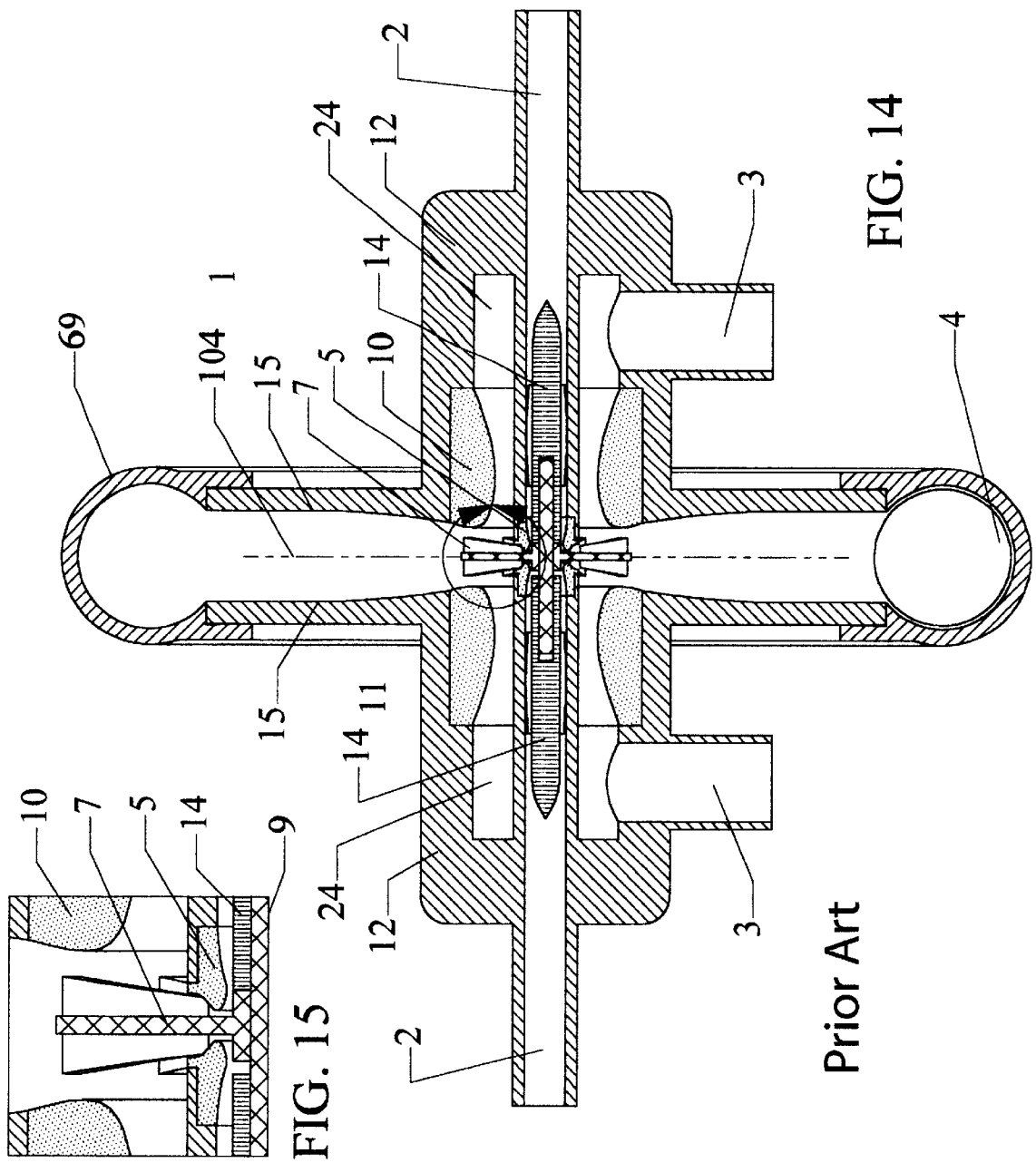

PRESSURE EXCHANGING COMPRESSOR-EXPANDER AND METHODS OF USE

FIELD OF INVENTION

This invention relates to ejector compressors and compressor-expanders, in particular, to their application to environmentally beneficial and energy efficient technologies in air-cycle refrigeration and power generation, turbochargers, and fuel-cell pressurization.

BACKGROUND OF INVENTION

During the course of the $20^{th}$ Century, science and engineering have brought us to an era whereby every American enjoys the availability of abundant energy as well as advanced technology for heating and air-conditioning of homes, transportation, and industry. Nevertheless, these wonders of modem society have come at a severe price to our global environment and to our reserves of non-renewable natural resources. Fossil fueled electrical power generation and automobiles have increased the level of carbon dioxide in the atmosphere to the point where deleterious global warming effects on the environment are predicted. Furthermore, due to the release of chlorofluorocarbons (CFC's) from conventional refrigeration and air conditioning systems, the ozone layer protecting the earth from deadly ultraviolet radiation is being depleted, with serious projected consequences for mankind. This crisis is considered so serious that 159 nations, including the United States, met in Kyoto, Japan in December of 1997 and signed a treaty designed to limit the buildup of carbon dioxide and other greenhouse gases in our environment. Immediately following the signing of the treaty, there was an outpouring of concern that meeting the targets outlined in Kyoto would be impossible without either modifying radically the American way of life, or of finding new energy-efficient and non-polluting technologies.

In FIG. 10 is shown a conventional ejector which is well known in the prior art. This pumping device has the advantage of extreme simplicity, there being no moving parts. The principle of operation is that the high energy primary fluid entering the ejector through primary fluid inlet conduit 2, passes through a supersonic nozzle 5, and emerges therefrom as a high speed jet. Upon exiting said supersonic nozzle, the primary jet entrains secondary fluid introduced through a secondary fluid inlet conduit 3 into a plenum 24 through the action of turbulent mixing between primary and secondary fluid. The primary fluid expands and imparts energy to the secondary fluid through turbulent shear forces generated in the mixing process. The mixing and subsequent diffusion is controlled by aerodynamic shroud 10 and the mixed flow is discharged from the ejector at mixed-fluid outlet conduit 4. It may thus be seen that an ejector is a compressor-expander characterized by direct-contact between primary and secondary fluids and with a common discharge. The advantage of such direct-fluid-contact devices is the extreme simplicity and consequent low cost and low space consumption and low weight in comparison with indirect-fluid-contact compressor-expanders. The conventional ejector, as a result of its simplicity, finds application in numerous technologies. Nevertheless, it suffers from low efficiency as a result of the inherent irreversibility of the mechanism with which it operates: turbulent mixing. Despite a century of research on improving this device, its performance is limited by the nature of the physics of its operation.

Yet another disadvantage of the conventional ejector is that although energy is exchanged between primary fluid and secondary fluid, the said primary and secondary fluids are irreversibly mixed at said common discharge. In fact, research in improving conventional ejectors has generally focused on enhancing mixing between primary and secondary fluids. While for many applications, this is acceptable, it has precluded the use of ejectors in applications requiring minimal mixing of primary and secondary fluid streams and separation of the flows at discharge. For such applications, primary and secondary flows must be discharged diffluentially. For such applications requiring diffluential discharge, conventional compressors and expanders are used whereby a compressor is mechanically driven by an expander, and the primary and secondary flows do not mix. These machines are called "compressor-expanders" and generally utilize expanders and compressors which individually operate as either positive displacement machines such as piston-type reciprocating, lobe, or twin-screw compressors or motors, and turbomachines such as turbines and centrifugal compressors. A typical prior art compressor-expander is shown in FIG. 22. It can be seen that the primary fluid stream is applied through inlet conduit 2 to the expander 83, and is discharged through outlet conduit 72. The secondary fluid is applied through inlet conduit 3 to the compressor 84 and is discharged separately through outlet conduit 74. Compressor 84 is driven through shaft 85 by expander 83. In this case, each fluid stream maintains its integrity with diffluential discharges and no combining takes place unless special provision is made by design. Such compressor-expanders are used in many applications of commercial or industrial importance. For example, compressor-expanders are used for fuel cell pressurization, turbo-charging internal combustion engines, and for air-cycle heat pumps.

According to "Fuel Cells" by McDougall, John Wiley & Sons,1976, page 78, the first successful working fuel cell was produced by F. T. Bacon in 1957. This fuel cell had a working temperature of 200° C. and a pressure of 20–40 atm. For all fuel cells, the well known Nernst equation predicts that the output voltage of a fuel cell should increase with the partial pressures of fuel and oxygen. For many types of fuel cells, the power output and the efficiency of the fuel cell stack generally increases with pressure as well. For example, the "Fuel Cell Handbook" by Appleby, Van Nostrand-Reinhold, 1989, discusses the improvements in power output and efficiency obtained by pressurizing various types of fuel cells including the Phosphoric Acid Fuel Cell (PAFC), the Molten Carbonate Fuel Cell (MCFC), and the Solid Oxide Fuel Cell (SOFC). However, in all cases, this improvement in performance must be paid for by the energy input required to compress the reactants and the increased complexity of the system. In theory, an ideal compressor-expander can pressurize the fuel cell with a minimal energy requirement if the compressor and expander operate at 100% efficiency. In such a system, the fuel cell is pressurized on the air side by a compressor, and the oxygen depleted exhaust gases energize an expander which drives the compressor, requiring very little additional energy input. In practice, component efficiencies become very crucial, and substantial amounts of external energy must be supplied, thereby lowering the improvement in overall system efficiency gained through pressurization. With current technology, this can involve very expensive and bulky machinery. For this reason, in the current state-of-the-art, PAFC's, MCFC's, and SOFC's, are normally operated at atmospheric pressure.

While the advantages and disadvantages of pressurization apply to all fuel cells, they have recently become of prime importance in the Department of Energy "Partnership for a New Generation of Vehicles" (PNGV) program in fuel cells for automobiles where the goal is to obtain a vehicle which will achieve 80 miles/gallon of fuel. Current emphasis in the PNGV fuel cell vehicle program is to use the Proton Exchange Membrane Fuel Cell (PEMFC) since this type offers reduced weight and size, faster start-up, operation at room temperature, and potentially lower cost. Such a fuel cell is normally pressurized to about 3 atmospheres on the air side, and with hydrogen rich gas produced by an on-board gasoline reformer. Kumar (U.S. Pat. No. 5,248, 566) calls for PEMFC operating pressures of about 2–5 atmospheres on the hydrogen side. With PEMFC's in the automotive environment, pressurization is particularly important since the size of the stack must be minimized while the power output maximized. Also, since the PEMFC has a solid fluorocarbon electrolyte which must be humidified in order to function, a sufficiently high water vapor pressure without diluting the hydrogen and oxygen can only be obtained if the system is pressurized. Furthermore, Strasser (U.S. Pat. No. 5,543,238) teaches that recirculating a portion of the humid cathode (oxygen-side) exhaust is beneficial in maintaining the PEMFC electrolyte at the proper moisture level for optimal conductivity. Thus, a critical technology in the success of a fuel-cell-powered automobile is a high efficiency compressor-expander, capable of a wide dynamic range of operation, diffluential discharges, low in cost, low in volume and weight, and capable of controlled recirculation for humidity control. An objective of the present invention is to provide a compressor-expander which can meet these requirements.

Another important area of application of compressor-expanders having diffluential discharge is in turbo-chargers for internal combustion engines. In this application, referring to FIG. 22, pressurized exhaust from the engine typically passes through an expander 83 through inlet conduit 2 before being discharged to the exhaust system of the vehicle through outlet conduit 72. The expander 83 typically drives a compressor 84, through a common shaft 85, which takes suction of fresh air through inlet conduit 3 from the surroundings and discharges into the engine through outlet conduit 74. Heywood in "Internal Combustion Engine Fundamentals, McGraw-Hill, 1988, states that a typical air discharge pressure is around 2.0 atmospheres. By so increasing the charge of oxygen in the cylinder during combustion, it is possible to burn more fuel per combustion event, and thereby derive more power from an engine at a given rotational speed and with a given displacement volume. In the current state-of-the-art, separate turbines and compressors are used. This equipment is costly and consumes a considerable amount of valuable space. An object of the present invention is to provide a compressor-expander which addresses these deficiencies.

In order to reduce the $NO_x$ emissions from internal combustion engines, as much as 30% of the exhaust gas can be recirculated. With conventional turbo-chargers, there has been much interest in incorporating the exhaust gas recirculation (EGR) system with the turbo-chargers. Examples of such attempts include Evans (U.S. Pat. No. 4,249,382), Fortnagel (U.S. Pat. No. 4,956,973) and Kriegler (U.S. Pat. No. 5,131,229). In all of this prior art, bypass valves are used to open conduits connecting the expander discharge with the compressor inlet. Such devices consume space, are costly, and require complex controls. An object of the current invention is to provide a compressor-expander for internal combustion engines which will enable exhaust gas recirculation without complex equipment.

Another important application for compressor-expanders having diffluential discharge is in air-cycle heat pumps. An example of such a system is shown in Ostersetzer (U.S. Pat. No. 5,373,707). Such machines find their greatest application in aircraft where a ready source of high pressure air is available either from by-pass air taken from a compressor-stage of a gas-turbine propulsion engine, or, in the case of supersonic aircraft, from the ram air captured from external aerodynamic surfaces. If an internal space is to be cooled for climate control, as for life support or avionics cooling, a typical arrangement is as follows: referring to FIG. 22, the expander 83 receives high pressure air from one of the said sources, usually after a heat removal process, through conduit 2, and said air expands in the expander 83 doing work and relinquishing its energy. In so doing, it emerges from the expander 83 through conduit 72 with substantially lower energy which is manifested by a greatly reduced temperature. The expander discharge is conducted through conduit 72 into the space for cooling. Said expander 83 drives a compressor 84 through a common shaft 85. Said compressor 84 extracts air from said space through conduit 3 and compresses it. The discharge through conduit 74 from the compressor 84 is generally discharged to the outside, and, in the case of an aircraft, can contribute to the propulsive thrust due to its high kinetic energy if a centrifugal compressor of the proper design is selected.

The compressor-expander can also be used for heating by rearranging the conduits. In such case, the expander 83 receives energy from the high pressure source through conduit 2, but discharges to the outside through conduit 72. Air from the outside is brought to the compressor 84 through conduit 3 which, as before, is driven through a shaft 85 by the expander 83. The air discharging from the compressor 84 through conduit 74 has been energized and therefore emerges hot, by virtue of its increased stagnation temperature. It is therefore conducted to the space to be heated through conduit 74. Air discharged from the heated space is directed to the outside. While the greatest current application for the air-cycle heat pump is with aircraft, one of ordinary skill in the art would know that such equipment could equally be used for other applications and with fluids other than air.

In direct-fluid-contact compressor-expanders, pressure-exchange is the mechanism by which the interface pressure forces between a primary fluid and a secondary fluid enable the primary fluid to do work on the secondary fluid. This process can only exist in a flow which is non-steady in the laboratory frame of reference since pressure forces acting on stationary surfaces can do no work. The work of interface pressure forces, or pressure-exchange, is distinct from the work of turbulent shear stresses. In the latter, a primary fluid of high energy entrains a secondary fluid of lesser energy, and thereby exchange energy through the work of frictional forces exerted at the shear layer. This latter mechanism of direct-fluid-contact energy transfer relies on turbulent mixing between primary and secondary fluids, while pressure-exchange does not involve mixing, notwithstanding the fact that in any real direct-fluid-contact machine, some mixing will inevitably occur. Foa (U.S. Pat. No. 3,046,732) and Garris (U.S. Pat. No. 5,647,221) disclosed new types of ejectors which operate on the pressure-exchange principle as opposed to the turbulent entrainment principle of conventional ejectors. However, these inventions did not disclose means of diffluential separation of primary and secondary fluids prior to discharge from the ejectors. Compressor-expanders of the wave-rotor type, also functioning as a result of pressure-exchange, were invented by Seippel (U.S. Pat. No. 2,399,394), Spalding (U.S. Pat. No. 3,074,620), Berchtold (U.S. Pat. No. 3,012,708), Komaur (U.S. Pat. No.

4,398,868), and Paxson (U.S. Pat. No. 5,267,432). These inventions did permit separate diffluential discharges of primary and secondary. With all of the pressure-exchange compressor-expanders, due to the reversible nature of pressure-exchange, high efficiencies can theoretically be obtained, particularly in comparison with conventional ejectors. Despite much effort on wave rotors, and some success in turbo-charger applications, their complexity has not enabled them to be competitive with conventional compressor-expanders. An objective of the present invention is to provide a compressor-expander with high efficiency by utilizing the advantages of direct-fluid-contact pressure-exchange while maintaining mechanical simplicity and permitting separate discharges of primary and secondary fluids.

Figures of merit on compressor-expander performance, including ejectors, is provided by comparing the performance of a compressor-expander with the ideal-compressor-expander analog. In the ideal-compressor-expander analog, referring to FIG. 22, both expander 83 and compressor 84 operate adiabatically and isentropically. The ideal-compressor-expander analog to an ejector is obtained by conducting an energetic primary fluid through inlet conduit 2 to expander 83, and conducting a lower energy secondary fluid to compressor 84 through inlet conduit 3, and combining the outlet conduits 72 and 74 into one common discharge (not shown). Since real compressor-expanders inevitably include irreversible processes such as mixing and heat transfer, and are therefore not actually isentropic or adiabatic, their performance is poorer than the ideal-compressor-expander analog. However, comparison with the ideal forms a logical basis for which all compressor-expanders, including ejectors, can be judged.

Foa(U.S. Pat. No. 3,046,732) invented an ejector which utilized the benefits of pressure exchange through the use of rotating primary jets. He further showed how the rotating primary jets, when incorporated into a rotor, could be made self-actuating by means of canting the nozzles at an angle with respect to the azimuthal plane. Garris (U.S. Pat. No. 5,647,221) taught how when the working fluid was compressible, shock and expansion wave patterns could be used to advantage in effecting flow induction by pressure-exchange. Garris (U.S. Pat. No. 5,647,221) further taught how pressure-exchange ejectors might effectively be utilized in ejector refrigeration. While these prior art devices offer effective aerodynamic means to provide excellent use of pressure-exchange to affect flow induction, they are deficient in that they require a very high degree of precision in manufacturing to provide the level of sealing necessary while allowing the rotor to spin at the high angular velocities necessary to achieve effective pressure-exchange. Furthermore, in these prior-art pressure-exchange ejectors, the demands on the rotor thrust-bearing are very high due to the high internal supply pressure and the low external suction pressure occurring simultaneously with very high rotor angular velocities. This very demanding combination of requirements for sealing, high rotational speeds, and thrust bearing tend to substantially increase the cost of the device and reduce its potential service life. It is therefore the principal objective of the present invention to provide an ejector which effectively exploits pressure-exchange for flow induction, yet is less demanding with regard to sealing, thrust management, and high rotational speeds. Another objective of the present invention is to provide a pressure-exchange ejector which is simple and economical to manufacture.

After many years of attempts to break the sound barrier, Chuck Yeager in his Bell X-1 aircraft succeeded on Oct. 14, 1947 at achieving Mach 1.06. By 1967, the Lockheed SR-71 Blackbird was in service and flying at sustained speeds exceeding Mach 3.0, while the North American X-15 flew at Mach 7.0 that same year. This rapid advance in high speed aeronautics technology was due to the realization that optimal design for supersonic compressible flow was radically different than that for subsonic flow. While the application of the design principles of supersonic compressible flow are now in common usage in aerospace applications, they have not been effectively applied to pressure-exchange compressor-expanders. An objective of the present invention is to advantageously utilize these principles so as to provide a pressure-exchange compressor-expander which overcomes the aforementioned shortcomings of the prior art.

SUMMARY OF INVENTION

In the development of new technologies which will enable us to continue to enjoy our prosperity yet preserve the environment, there has been a profound need for high efficiency compressor-expanders in the following technologies:

1. Refrigeration/air conditioning.
2. Gas Turbine engines.
3. Rankine Cycle engines.
4. Turbo-chargers for internal combustion engines
5. Pressurizing units for Fuel Cells.

These are areas of technology whereby improvements can have a major global impact on the amount of the energy we consume and the pollution we create, particularly with regard to greenhouse gases and ozone layer depleting chemicals. Progress in beneficially utilizing direct-fluid-contact ejectors has been hampered by their inherently low efficiency due to the fundamental operating mechanism of turbulent entrainment in the case of conventional ejectors, or by difficulties in mechanical design under the combined requirements of high thrust—high angular velocity—efficient sealing for the case of prior art pressure exchange ejectors. Furthermore, progress in using such devices as compressor-expanders, which maintain the integrity of the primary and secondary fluids at discharge, has been hampered by problems in separating the flows after energy exchange.

The present invention provides a direct-fluid-contact pressure-exchange compressor-expander with diffluential discharge capable of levels of performance comparable with ideal-compressor-expanders while maintaining a degree of simplicity hitherto unavailable in the art. By the use of the principles of supersonic aerodynamics, the mechanical complexity of the prior art pressure-exchange ejectors is reduced, and the demands for sealing and thrust management are significantly assuaged. As a result of the lower stresses and the avoidance of sealing, the pressure-exchange compressor-expander provided herein is capable of operating at extremely high temperatures.

In the instant invention, a primary-fluid comprising a compressible gas or vapor at a high stagnation pressure is introduced through suitable piping to a housing at the location of a primary-fluid inlet conduit. Said primary-fluid is then conducted to a supersonic nozzle whereby it is accelerated to supersonic speeds. As a result of the acceleration, the static pressure of the primary-fluid at the discharge of the nozzle is substantially reduced. The primary flow will then impinge upon canted vanes fixedly attached to a free-spinning rotor, thereby causing the rotor to spin at a high rotational speed. Over the wedge-shaped vanes, oblique shock structure will form, creating a series of expansion fans and compression waves which will force the secondary fluid to expand into the interstices between the peripherally spaced oblique vane-shock structures and behind the vanes. A secondary-fluid is introduced to the said housing through suitable piping and then conducted to the vicinity of the nozzle discharge. An aerodynamic shroud further directs the secondary fluid into the vicinity of the rotor vanes and associated shock and expansion fan structure. Momentum will be exchanged between the primary-fluid and the secondary-fluid at the interfaces between said primary fluid and said secondary fluid through pressure-exchange. It is known that the pressure-exchange process occurs very rapidly after primary and secondary fluids come into contact. Normally, the pressure-exchange process is complete after a downstream distance of about 5 rotor-vane widths. After pressure-exchange occurs, the primary and secondary fluid can either be mixed and diffused to subsonic speeds before being transported to the mixed-fluid outlet conduit, or they can be separated diffluentially. In the former case, the compressor-expander is called a "pressure-exchange ejector". In the latter case, the device is a generic "pressure-exchange compressor-expander". Thus, the pressure-exchange ejector may be regarded as the special case of the pressure-exchange compressor-expander whereby the de-energized primary fluid discharge and the energized secondary fluid discharge are combined, mixed, and directed to a common unifluential discharge port. In the case of the pressure-exchange ejector, at the discharge, the specific energy, and stagnation pressure, of the mixed discharge flow will be greater than that of the secondary flow, but less than that of the primary flow. This energized and compressed unifluential mixed-fluid may now be used for its intended application.

In the generic case of the pressure-exchange compressor-expander, the de-energized primary fluid can be discharged separately from the discharge of the energized secondary fluid thereby providing diffluential discharge. This separation is possible in the present invention since the pressure-exchange process occurs very rapidly as the primary fluid and the secondary fluid come into contact in the supersonic wake regions behind the vanes and undergo a mutual deflection to a common orientation in the rotor frame of reference. During this process, very little mixing or heat transfer occurs. Since following the pressure-exchange process, both primary and secondary fluids are in direct contact with each other, some mixing is inevitable. However, if the separation is affected shortly after completion of the pressure-exchange process, both primary fluid and secondary fluid can. maintain substantial integrity. In the present invention, the rotor can be conceived of consisting of three rigidly connected sections, each a body which is revolute about the rotor's axis of rotation. Typically, all sections would be integrally fabricated with the rotor, but one could easily fabricate them separately and join them in a manner such that during operation, they do not pivot relative to one another. However, one of ordinary skill in the art might introduce azimuthal adjustability between sections. Furthermore, the desirability of having means for making adjustment during operation in some applications is anticipated in the present invention. The first section is the vaned section where supersonic shock and expansion fans are established by the use of vanes in order to create rotating interstices into which the secondary fluid will penetrate. The second section of the rotor is the pressure-exchange section and is where pressure-exchange is allowed to take place. The third section is the selective deflection section where either primary fluid or secondary fluid, or a combination thereof, can be diverted into its own plenum. The combination of primary and secondary fluids that are deflected after pressure-exchange in said deflection section are herein termed "first-fluid". The remaining combination of primary and secondary fluid that is not deflected after pressure-exchange is herein termed "second-fluid". A basic concept of the invention is that at the conclusion of the pressure-exchange phase, in the rotor frame of reference, the primary fluid and the secondary fluid move in a common direction, which in general is different from the vane canting angle, and have the same static pressure, although, in general, different speeds, temperatures, densities, entropies, etc. In order to efficiently separate primary and secondary fluids, or to produce a predetermined combination of the two, the deflectors must be precisely located and the geometry of the deflectors and the passages there between must be precisely configured for the application. For maximum separation, the number of deflectors should precisely correspond to the number of vanes, and the azimuthal relationship between the deflectors and the vanes must precisely correspond to the trajectories of the respective primary and secondary fluid streams. The widths of the deflectors and the passages there between must correspond to the cross-sections of the respective fluid streams. The number and shape of vanes, and the corresponding shape and location of the deflectors, would be determined by one skilled in the art based on the design requirements for pressure ratio, working fluids, maximum allowable rpm, primary and secondary flow rates, and primary and secondary fluid temperatures and densities. In the case of the pressure-exchange ejector, integral rotor sections for the second and third sections are not needed.

It has been noted previously that for certain applications such as turbocharging of internal combustion engines and in fuel cell pressurization, controlled combining of primary and secondary fluid streams may be desirable. In the former case, the purpose is to recirculate exhaust gas in order to reduce $NO_x$ formation, and in the second case, the purpose is to conserve moisture in the fuel cell. In the present invention, this can easily be achieved by either reducing or increasing the number of deflection vanes, changing their widths, or changing their azimuthal phase relationship with regard to the vanes. Thus for example, let us consider maximum separation. For maximum separation, the number of vanes and the number of deflectors are equal, and the deflectors are azimuthally phased with respect to the vanes at an optimal angle determined by the locations of the respective fluid streams and sized such that all of either primary fluid or secondary fluid is deflected (depending on the design). The passages between the deflectors are configured to allow all of the secondary fluid to pass if all of the primary fluid were deflected, or, alternatively, the passages are configured to allow all of the primary fluid to pass if all of the secondary fluid were deflected. If the deflectors were not phased azimuthally by said optimal angle, but rather by a predetermined azimuthal displacement angle, then perfect separation would not occur resulting in some combining of primary and secondary fluids. Similarly, if the deflector vanes were of a width that did not deflect all of the primary fluid, then combining would occur. A third method of producing a predetermined amount of combining of primary and secondary fluid at discharge would be simply to have a different number of deflectors than vanes; for example, if a fraction of the deflectors were omitted, then a fluid-stream that would have been deflected would then discharge with its counterpart fluid-stream, and combining would occur. Similarly, if there were an excess of deflectors in comparison with the vanes, counterpart fluid-streams would be mixed.

Hence, the invention admits to a variety of methods of producing predetermined combining of primary and secondary fluids.

Note that in the current context, the word "combining" means allowing primary and secondary flows to merge together and to be conducted in a common flow path. The word "mixing" is taken to mean "combining" at a more intimate level, such as the Kolmagorov turbulence scale, or even the molecular scale. As a result of molecular diffusion and turbulence, for gases or vapors, a "combined" flow will become a "mixed" flow if sufficient time is allowed for these processes to occur. In the present invention, substantial mixing occurs only after the fluid streams pass the rotor.

A prime advantage of the supersonic flow design of this invention is that the complex rotational seals between the primary and secondary flows that are required in the prior art pressure-exchange ejectors are not needed, so that the instant pressure-exchange ejector is not sensitive to the effects of the thermal or centrifugal expansion of the rotor. Furthermore, it should be noted that in this invention, the flow over the surface of the rotor remains supersonic, hence the static pressure on the surface of the rotor is relatively low. This provides a substantial benefit in reducing the axial thrust load on the rotor, which, again, simplifies the manufacture, increases the service life, and reduces the cost. This invention permits the use of an abundant selection of materials and manufacturing methods for the fabrication of the various components. The most critical component is the rotor where centrifugal stresses and dynamic balance must be taken into account. Satisfactory rotors can be fabricated by CNC machining, casting, injection molding, powder metallurgy techniques, 3-D printing, and other methods. The supersonic design of the pressure-exchange compressor-expander herein disclosed greatly simplifies the manufacture of the ejector, increases the service life, and reduces the cost.

This disclosure further provides a pressurization system for fuel cell power plants which is particularly useful for automotive applications using PEM fuel cells. The disclosure recited herein has a compressor-expander which is powered by exhaust gases from the fuel cell and discharges said exhaust gas to the atmosphere. Said compressor-expander receives clean secondary air from the ambient and compresses it for discharge into the secondary inlet of a pressure-exchange ejector. The primary of said ejector is steam provided from a boiler. The steam provides the excess energy needed to make up for inherent losses, and it also provides needed moisture for the fuel cell. The disclosed system can be more compact than comparable compressor-expander-motor combinations utilizing conventional machinery.

Also disclosed in this invention is a novel turbo-charger for use in internal combustion engines using the pressure-exchange compressor-expander. This system is particularly useful for automotive applications where space, weight, and cost are critical.

Also disclosed in this invention is a novel air-cycle heat pump utilizing the pressure-exchange compressor-expander. Said heat pump is particularly useful for aircraft applications where a ready source of compressed air is available, space consumption and weight must be minimized, and high reliability is essential.

BRIEF DESCRIPTION OF THE DRAWINGS

FIG. 3 is a front view of a representative rotor in accordance with the embodiment of FIG. 1.

FIG. 4 is a side view of the same rotor shown in FIG. 3.

FIG. 5 is a rear view of the same rotor shown in FIG. 3.

FIG. 6 is angular projection of the same rotor shown in FIG. 3.

FIG. 14 is a sectional transverse view of a third embodiment of a prior art pressure-exchange ejector whereby the pressure exchange and diffusion occur in a radial configuration and axial thrust is eliminated by symmetric pressure balancing.

FIG. 15 is a blow-up of the interaction zone in the vicinity of the rotor of FIG. 14 which shows the radial supersonic nozzles and the secondary flow paths.

DESCRIPTION OF THE PREFERRED EMBODIMENTS

Figure 7:
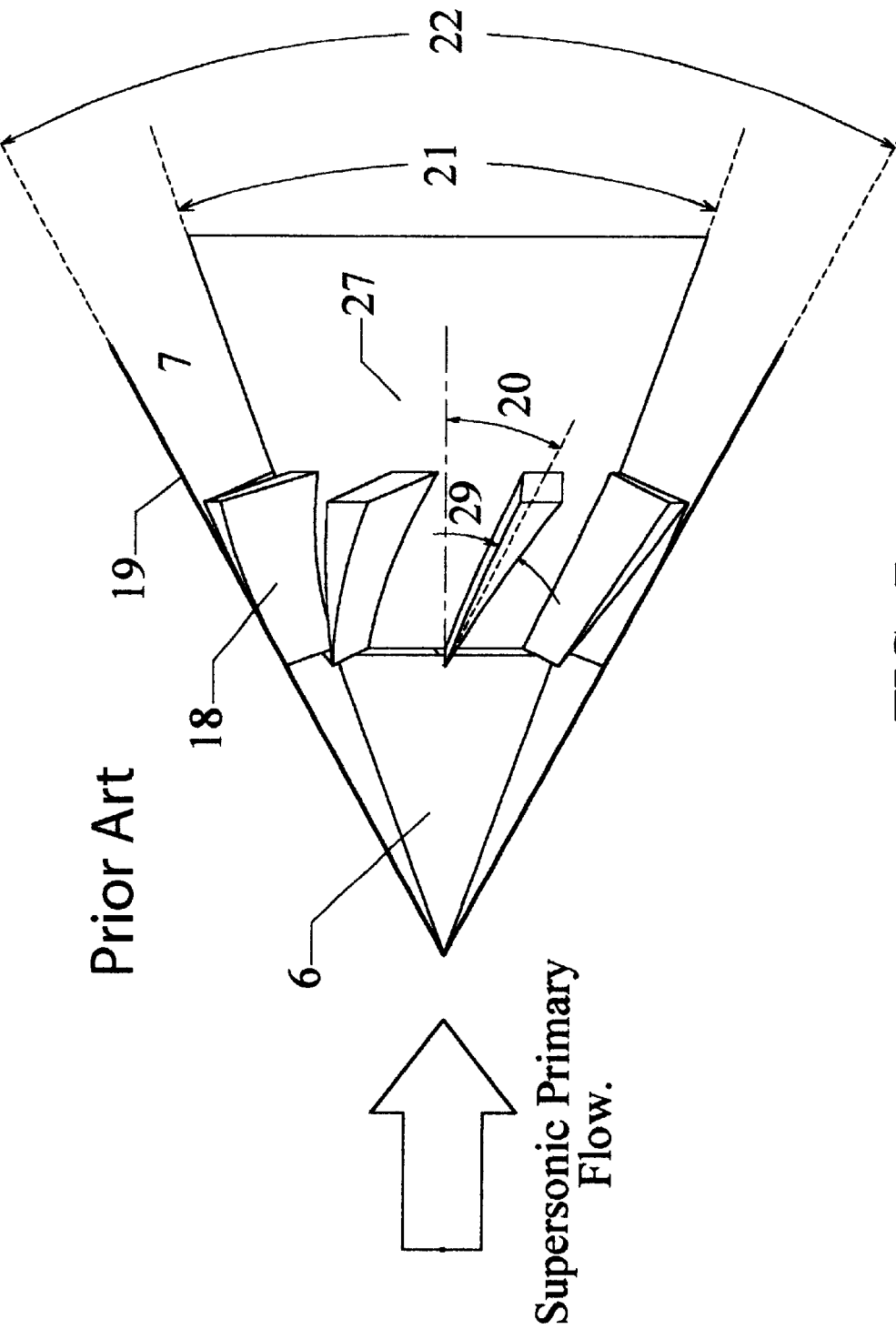
FIG. 7 shows a fore-body cone and a typical rotor with a fore-body shock wave illustrating the geometrical relationships for the embodiment of FIG. 1.
Figure 8:
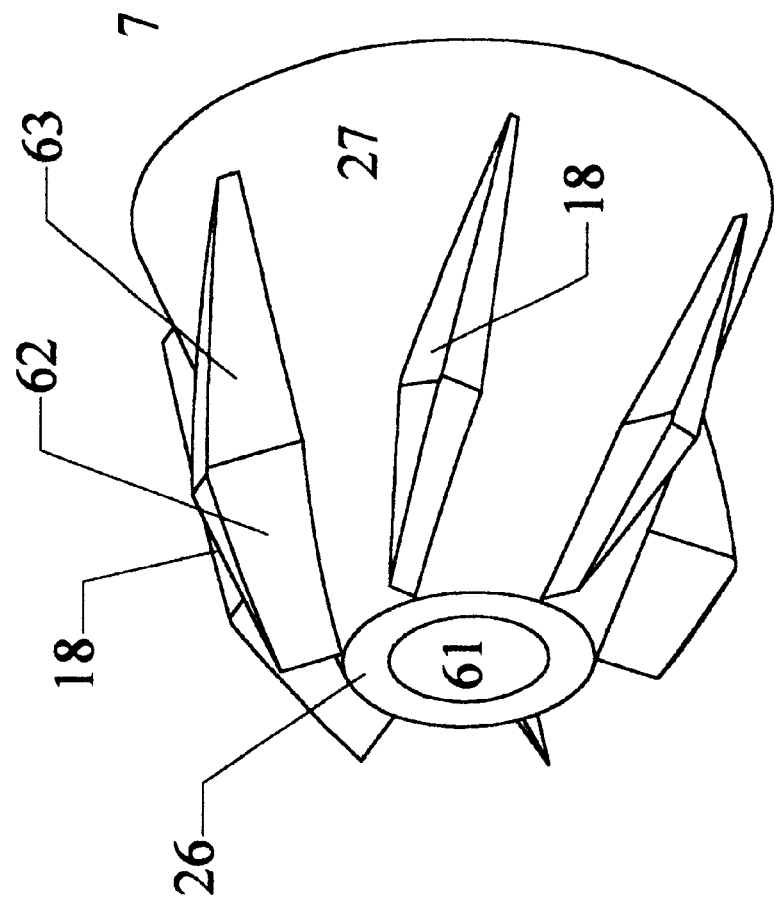
FIG. 8 shows a configuration of the rotor design for the embodiment of FIG. 1 incorporating a tapered trailing surface to control the expansion process.
Figure 9:
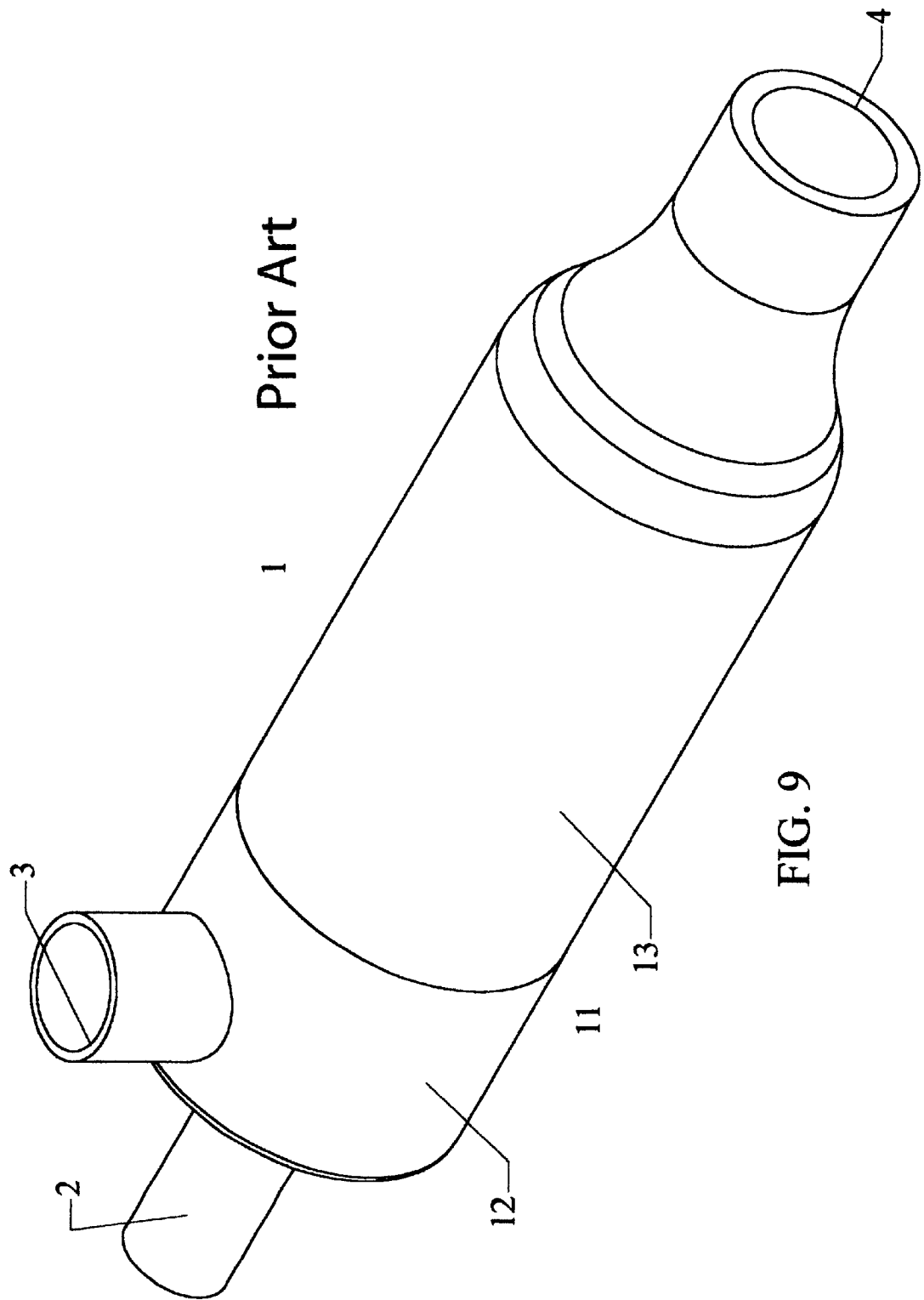
FIG. 9 shows an isometric projection of an external view of the assembled invention for the embodiment of FIG. 1.
Figure 10:
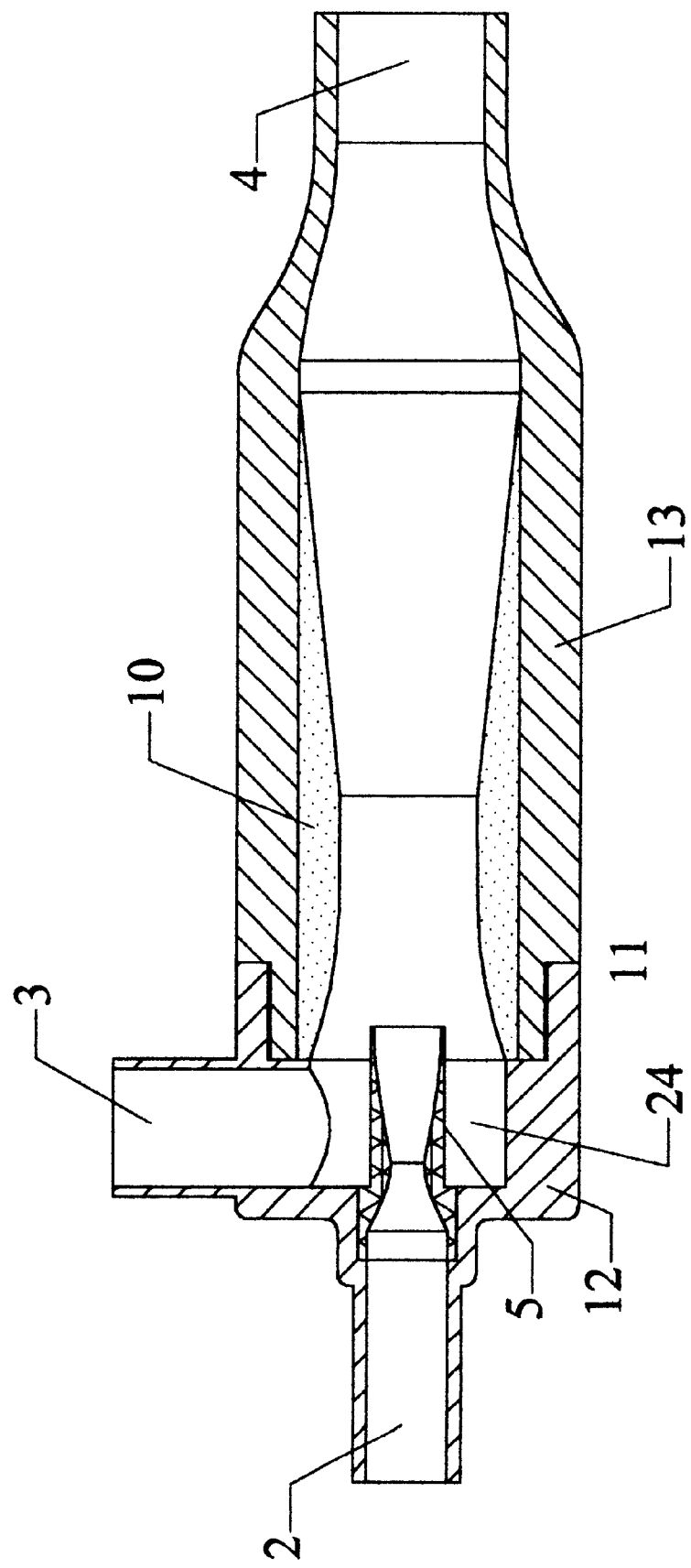
FIG. 10 shows a longitudinal sectional elevation of a prior-art conventional ejector.
Figure 21:
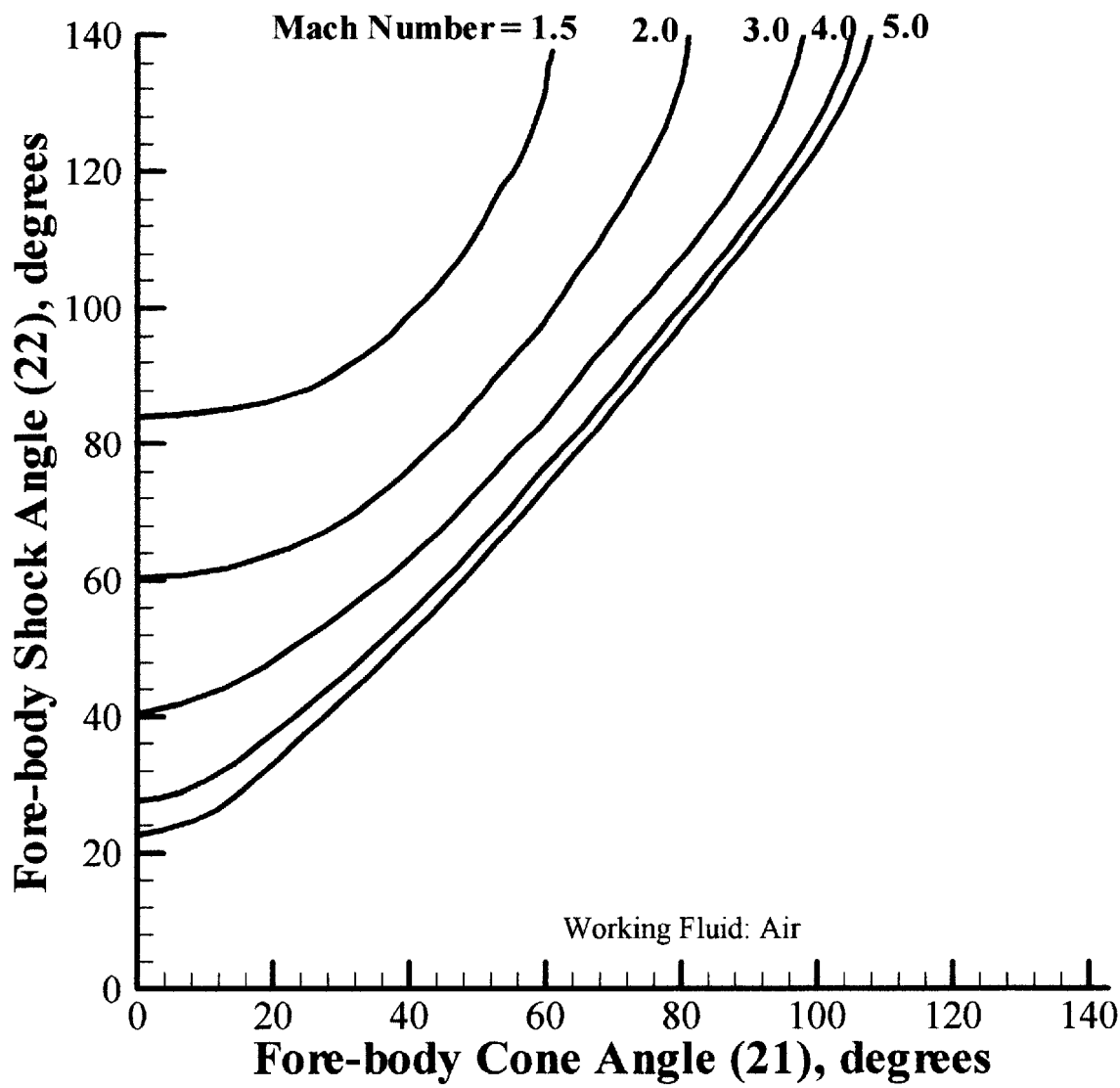
FIG. 21 shows the relationship between the fore-body cone angle and the angle of the attached fore-body shock for various upstream Mach numbers and for air.
Figure 22:
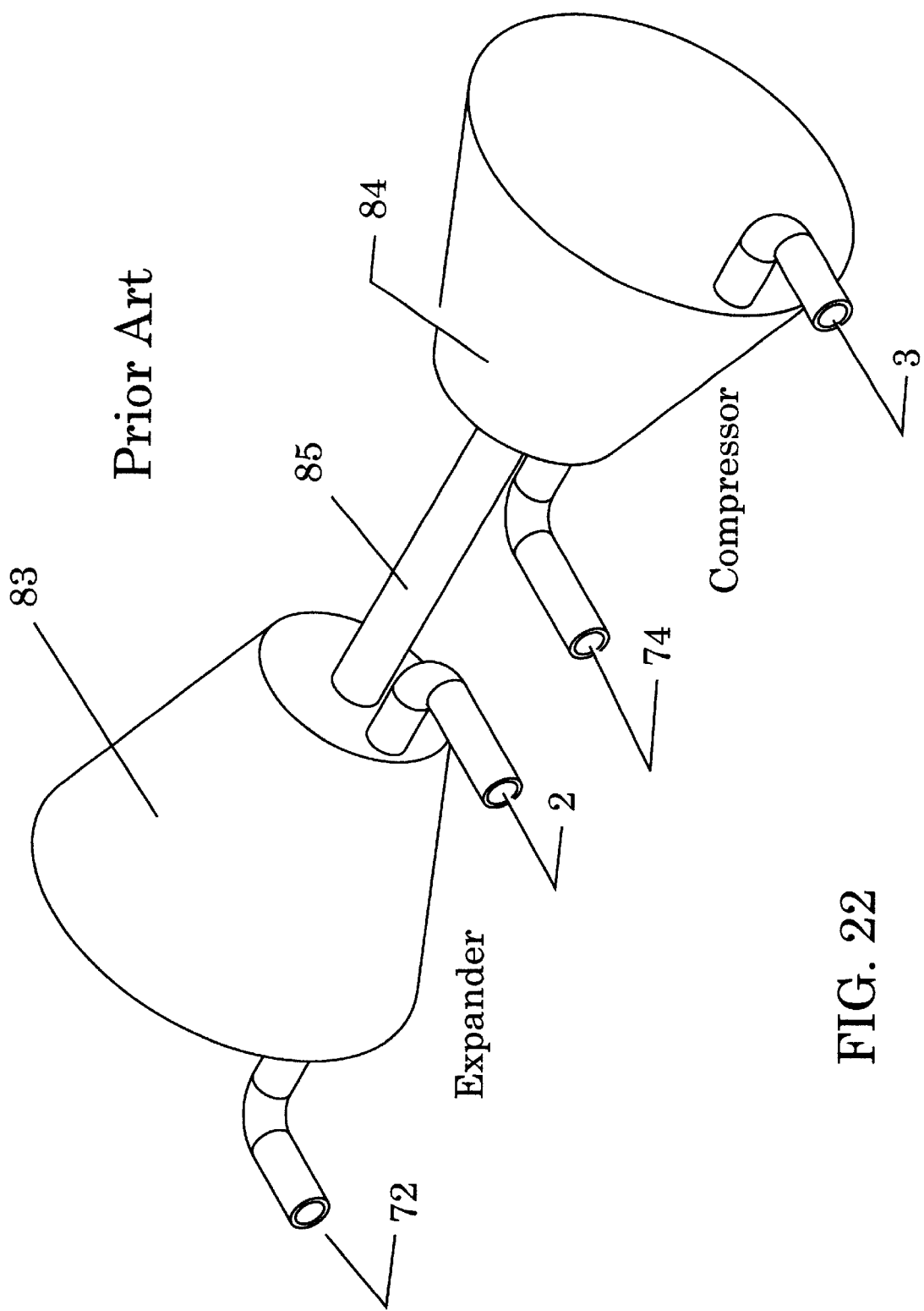
FIG. 22 shows a typical prior-art compressor-expander.
Figure 23:
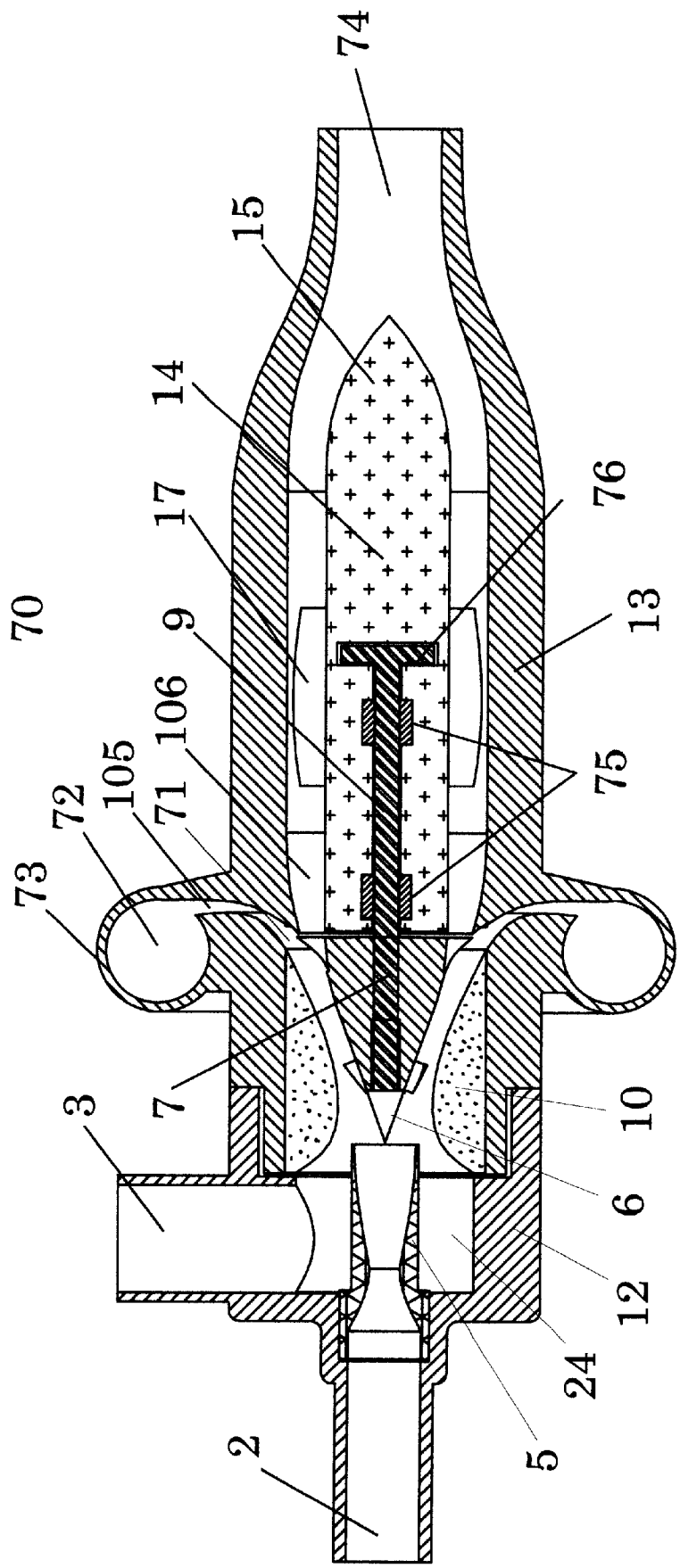
FIG. 23 is a longitudinal sectional elevation of an embodiment of the invention in the form of a compressor-expander placing the rotor between an upstream conical fore-body and a downstream spindle.
Figure 24:
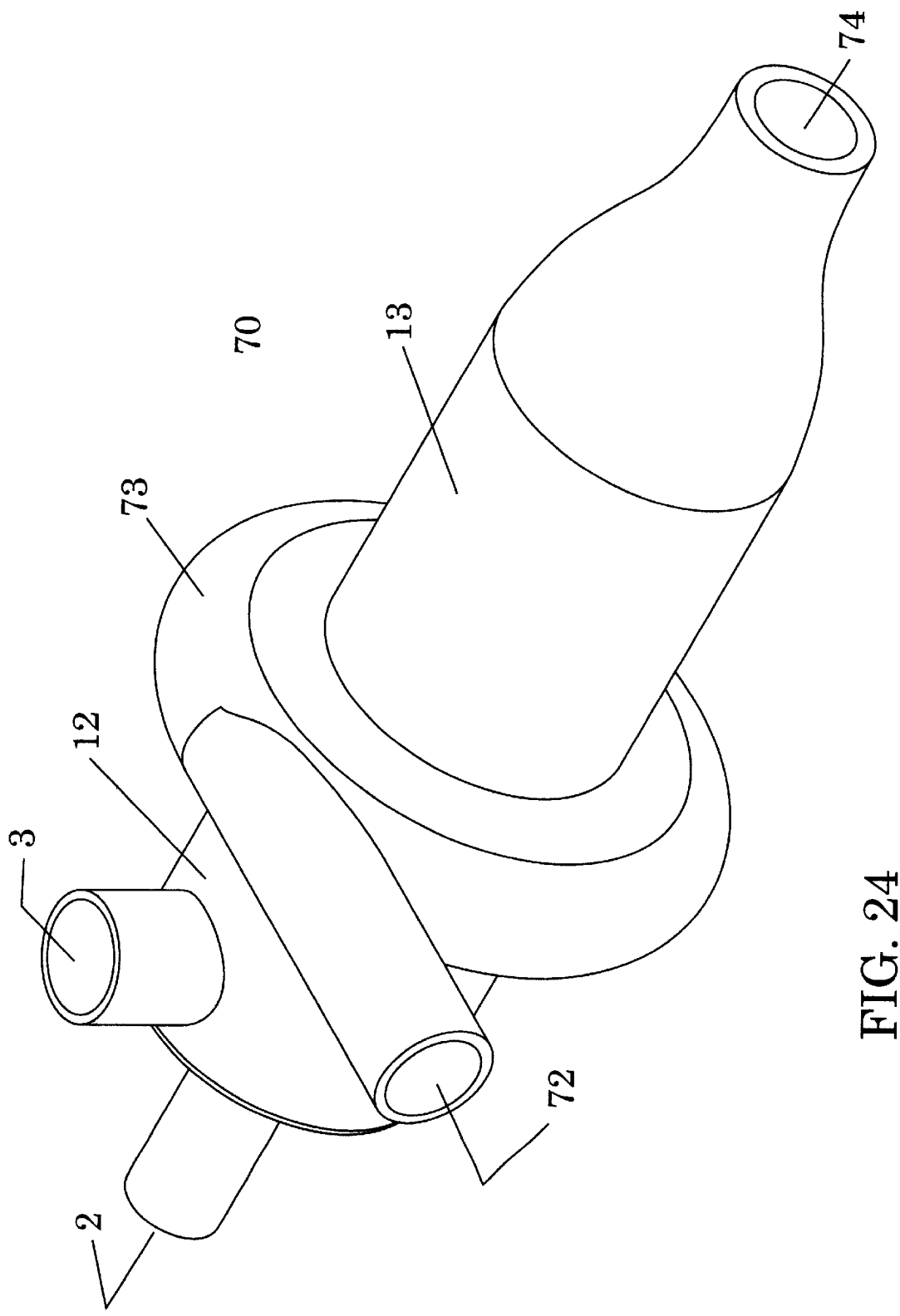
FIG. 24 shows an isometric projection of an external view of the assembled invention for the embodiment of FIG. 23.
Figure 25B:
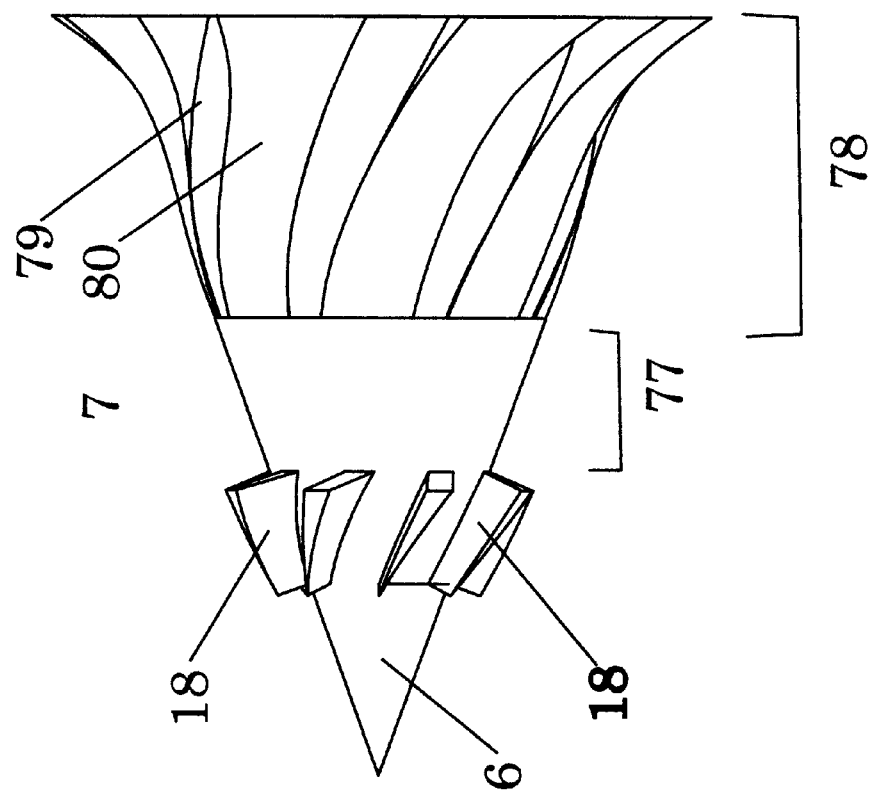
FIG. 25B is a side view of the same rotor shown in FIG. 25A.

An embodiment of the novel pressure-exchange compressor-expander disclosed herein is shown in a longitudinal sectional elevation in FIG. 23, and in an external assembly view in FIG. 24. Compressor-expander 70 is enclosed by a housing 11 which is shown consisting of an upstream section 12 and a downstream section 13 which are connected in a manner so as to provide structural rigidity and sealing, as would be provided by a threaded connection among other common methods, yet permit separation of said upstream and downstream sections in a manner convenient for assembly and disassembly. Said upstream section 12 provides a primary fluid inlet conduit 2 and a secondary fluid inlet conduit 3, a rigid support for supersonic nozzle 5, and a secondary fluid plenum 24. Said downstream section of the housing 13 provides rigid support for aerodynamic shrouds 10, rigid mount for the spindle 14, and an outlet conduit 72 for a first-fluid, and an outlet conduit 74 for a second-fluid. Said "first-fluid" consists essentially of that combined portion of primary and secondary fluid which is directed to outlet conduit 72. Said "second-fluid" consists essentially of that combined portion of primary and secondary fluid which is directed to outlet conduit 74. Outlet conduits 72 and 74 constitute diffluential discharges. Should the compressor-expander 70 be designed for operation with maximum separation, either said first-fluid would consist essentially of pure primary fluid and said second-fluid would consist essentially of pure secondary fluid, or said first-fluid would consist essentially of pure secondary fluid and said second-fluid would consist essentially of pure primary fluid. A compressible energetic primary fluid is introduced through said inlet conduit 2 and directed to converging-diverging supersonic nozzle 5 whereby the primary fluid is accelerated to supersonic speeds. It is known that when the stagnation pressure upstream of a converging-diverging supersonic; nozzle is above a certain critical value, the Mach number of the compressible fluid discharging from the nozzle is determined by the thermophysical properties of the working fluid and the ratio of the exit area to the throat area of said supersonic nozzle 5. When the working fluid is air, the supersonic nozzle 5 shown in FIG. 23 is a Mach 3.0 nozzle. However, a designer skilled in the art might select a nozzle of higher or lower Mach number depending on his/her design objectives. The less energetic secondary fluid is introduced through inlet conduit 3, passing through a plenum 24 which distributes the secondary fluid in an axi-symmetric manner around the exterior of supersonic nozzle 5 prior to being conducted downstream for pressure-exchange with the primary fluid. The supersonic primary fluid emanating from the exit of supersonic nozzle 5 impinges upon a fore-body 6 in such a manner that an attached conically-shaped oblique fore-body shock wave 19 forms at the apex of said fore-body 6 as seen in FIG. 7. In accordance with FIG. 21, the angle 22 of the fore-body shock 19 is a function of the Mach number of said primary fluid exiting from said supersonic nozzle 5, the thermophysical properties of said fluid, and the fore-body cone angle 21. The cone angle 21 is selected to be small enough to insure that the fore-body shock 19 is weak and is attached to the apex of said fore-body 6. Since the fore-body shock 19 is weak, the flow behind said fore-body shock 19 is preferably supersonic, although at a lower Mach number than the fluid upstream of said fore-body shock 19, and is forced to change direction so as to follow the contour of the fore-body 6. Immediately downstream of the fore-body 6 is a rotor 7 which is pivotally mounted so as to enable it to freely spin about the longitudinal axis of shaft 9. In the embodiment of FIG.23, the fore-body 6, the rotor 7, and shaft 9 are rigidly connected and rotate in unison with respect to the housing 11. However, in other embodiments of this invention, the fore-body 6 and shaft 9 may be stationary while the rotor is pivotally connected to said shaft 9 and rotates relative to the housing 11. As seen in FIG. 25B, the body of the rotor 7 has the shape of the frustum of a cone whose included angle is equal to that of the fore-body 6 and whose conical surface is approximately contiguous with that of the adjacent fore-body 6 so as to provide a smooth transitional flow path as the fluid progresses from the vicinity of the fore-body 6 to the vicinity of the rotor. Upon the conical surface of the rotor 27, a plurality of wedge-shaped vanes 18 are fixedly attached axi-symmetrically about the central longitudinal axis of rotor 7. The number of vanes 18 utilized can vary from two to a multitude, the number being determined by the pressure rise and mass flow ratio desired from the pressure-exchange compressor-expander 70, as well as the diameter of the rotor 7. In FIG. 7 are shown the geometrical attributes of the vanes 18, the fore-body 6 and the conical surface of the rotor 27 in relation with the fore-body shock 19. It is noted that in the preferred embodiment, the vanes 18 have a sharp leading edge and are characterized by a small wedge-angle 29. Furthermore, in the preferred embodiment shown in FIG. 7, in order to avoid the generation of unnecessary losses through a "paddling effect" resulting from the vanes 18 extending outside of the fore-body shock 19, the outer edges of the vanes 18, henceforth referred to as the vane tips, extend radially in such a manner so as to approximately correspond to the extended location of the fore-body shock 19. In FIGS. 3, 4, 5, 6, 25A and 25B it is seen that the vanes 18 are canted at a spin-angle 20 with respect to the longitudinal plane. One skilled in the art would select a spin-angle 20, generally between 5° and 45°, depending on the design requirements of the pressure-exchange compressor-expander 70 and the maximum allowable speed of rotation for the materials utilized. In the embodiments shown, the spin-angle 20 is 10° and the wedge-angle 29 is 5°. When the supersonic fluid stream passes over said canted vanes 18, free-spinning rotation is imparted to the rotor 7. The term "free-spinning" herein means that mechanical energy is neither added nor removed from the rotor 7 by means other than bearing fiction or aerodynamic drag. The rotational speed that the rotor 7 acquires is dependent upon the thermo-physical properties of the fluid, the Mach number of the fluid emanating from supersonic nozzle 5, the included angle 21 of the fore-body cone 6, and the spin-angle 20 of the vanes 18, and the bearing friction and aerodynamic drag. The presence of undesirable friction will reduce the rotational speed of the rotor 7 from that of the ideal free-spinning condition. When the supersonic fluid behind the fore-body shock 19 and in the vicinity of the fore-body cone 6 contacts the leading edge of a vane 18, a weak oblique vane-shock will form. To minimize shock losses yet maintain structural integrity, the wedge-angle 29 is generally between 5° and 30°. The vane-shocks from adjacent vanes 18 will intersect and reflect from each other. In the preferred embodiment, so as to minimize losses from shock reflections, the chord-length of each of the vanes 18 should be limited so that the reflected vane-shocks, as well as fore-body shock 19 reflections from the primary-secondary interface, do not impinge on the vane 18. At the rear of each vane 18, a 3-dimensional expansion fan will develop. This expansion will draw secondary fluid down into the interstices behind the vanes 18 and initiate the pressure-exchange process between primary and secondary flows. In the preferred embodiment, the trailing surfaces of the vanes 18 are approximately perpendicular to the rotor body. However, this is not critical to the inventive concept of the pressure-exchange compressor-expander 70, and embodiments with forward or reverse sweep are anticipated by this invention. Furthermore, one skilled in the art might choose to better control the expansion fans behind the vane 18 by shaping the trailing edge into an aerodynamic form such as an inverted wedge, as shown in FIG. 8 where said vanes 18 have a leading surface 62 and a trailing surface 63.

Figure 25A:
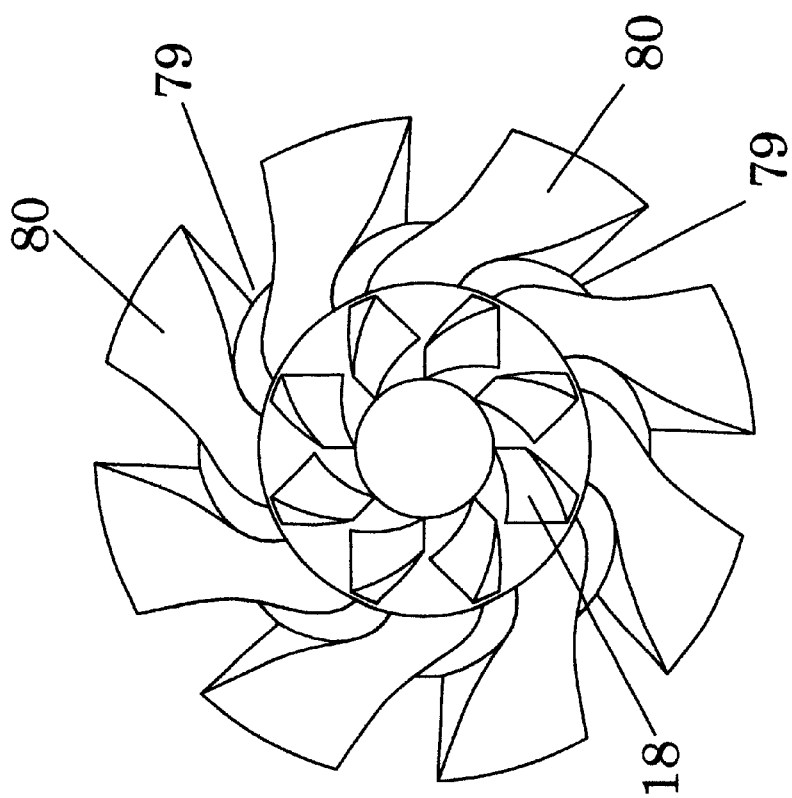
FIG. 25A is a front view of a representative rotor in accordance with the embodiment of FIG. 23 showing fore-body, vanes, pressure-exchange section, and deflectors.

Referring now FIGS. 25A and 25B, it can be seen that downstream of said vanes 18 is a section 77 whereby pressure-exchange takes place. In the configuration shown, the length of this section is approximately seven times the width of the vane 18 at its rear. However, the optimal length 77 is determined by the physical requirement for complete pressure-exchange to take place and whether or not complete separation is desired. Thus the actual ratio could be as small as 2 and as large as 20. However, if the pressure-exchange section is excessively elongated, mixing will occur and separation will become progressively difficult.

Following the pressure-exchange section 77 is the deflection-section 78. In FIG. 25A it is seen that deflectors 80 are placed at an azimuthal position relative to the vanes. The configuration shown is for optimal separation whereby primary fluid would be deflected over the deflectors 80, while secondary fluid would pass through the passages 79 between the deflectors 80. By changing the azimuthal phase relationship between the deflectors 80 and the vanes 18, the secondary fluid could be deflected by the deflectors 80, while the primary fluid could be allowed to pass through the passages 79.

Figure 26:
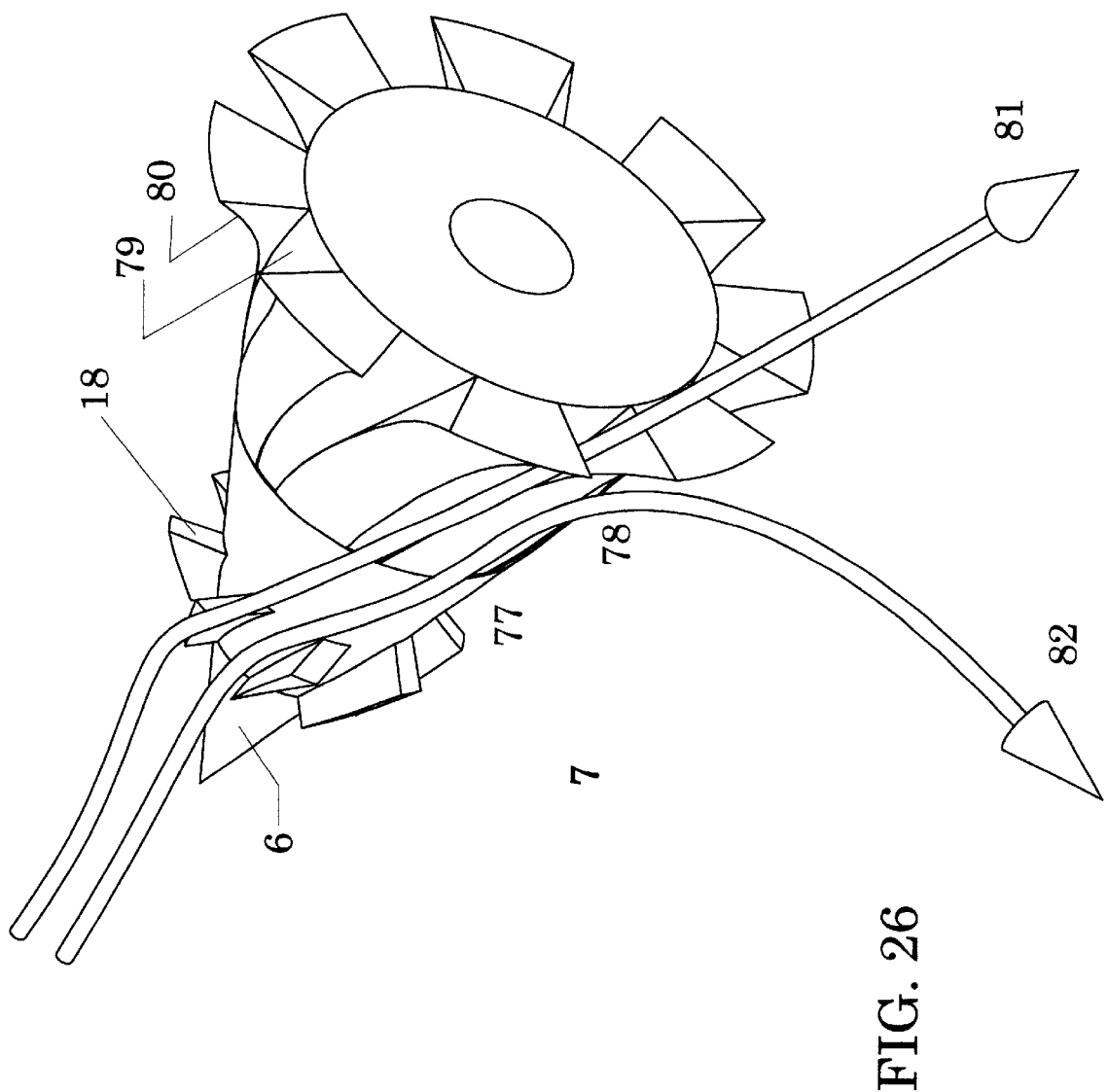
FIG. 26 is a schematic showing operation of deflectors and passages in separating primary and secondary fluid-streams.

The mode of operation of the deflectors 80 for the case of maximum separation whereby the primary fluid is deflected by deflectors 80 is shown in FIG. 26. It is therein seen that secondary-stream 81 passes over said vane 18 and expands into the region downstream of said vane 18 wherein it is brought into contact with primary fluid-stream 82 which passes between said vanes 18. In the pressure-exchange section 77, both primary-fluid-stream 82 and secondary-fluid-stream 81 mutually deflect to a common orientation and flow parallel to one another. As soon as possible after pressure-exchange, deflector 78 deflects said primary-fluid-stream 82 radially, while said secondary-fluid-stream passes axially and unobstructed through passage 79. Thus, said primary fluid becomes said first-fluid and said secondary fluid becomes said second-fluid.

Note that in the embodiment shown in FIG. 23, the vanes 18, the pressure-exchange section 77, and the deflector section 78 are all integral with the rotor 7. However, it is intended that in the present invention, the sections could be fabricated separately and rigidly assembled. Furthermore, adjustability of the azimuthal position of the deflector section 78 relative to the vanes 18, both during operation and during disassembly is contemplated in the present invention.

Referring to FIGS. 23 and 25B, the aerodynamic surfaces of an aerodynamic shroud 10, the first-fluid extraction port 71, the first-fluid diffuser 105, the second-fluid extraction port 106, the second-fluid diffuser 15, said spindle 14, and said housing 11, control four essential sequential processes: i. the direction and acceleration of the secondary fluid from the plenum 24 into the interaction section in the vicinity of the rotor 7 and the vanes 18; ii. the pressure-exchange process which occurs in the region 77 immediately downstream of the vanes 18; iii. the deflection and capture of the first-fluid and second-fluid; and, iv. the deceleration, diffusion, and collection of said first-fluid and said second-fluid. In other embodiments of this invention, one skilled in the art could control these said four functions by employing a plurality of strategically placed aerodynamic surfaces such as 10, 71, 14, 105, and 15 in other geometrical configurations such as those shown in FIGS. 12 and 14 with possible modifications to enable extraction of first-fluid and second-fluid.

In the downstream housing portion 13 is included an extraction port 71 through which first-fluid is deflected. Extraction port 71 is axially symmetric and is connected downstream to aerodynamic surfaces for diffusing said first-fluid with vaneless diffuser 105. After pressure exchange, the primary fluid acquires angular momentum in the counter-rotating direction, while the secondary flow acquires angular momentum in the direction of rotation. If the bearings were ideally frictionless, the sum of the angular momentum of the primary and the angular momentum of the secondary be zero since no torque is applied and the initial angular momentum of both primary and secondary flows is zero. Hence, for the condition of maximum separation where said first-fluid consists essentially of primary fluid, the extraction port 71 should lead to a toroidal or scroll-shaped flow passage 72 connecting to a primary flow discharge port 72 which is directed in the opposite direction to rotation as is indicated in FIG. 24. By way of example, if one skilled in the art elected to have first-fluid to consist essentially of secondary fluid, while the second-fluid consists essential of primary fluid by the simple expedient of changing the azimuthal relationship between the rotor vanes 18 and the deflectors 80, the discharge conduit 72 would be directed in the direction of rotation, or opposite to that shown in FIG. 24. The portions of the aerodynamic surfaces of the extraction port 71 in close proximity to the rotor 7 and, more particularly, to the deflectors 80, should be such that the fluid negotiates a smooth transition in leaving the edges of the deflectors 80 and entering the extraction port 71 in order to minimize stagnation pressure losses.

In the embodiment shown in FIG. 23, the fore-body 6, the rotor 7, the shaft 9, and the thrust disk 76 are rigidly connected and rotate as one body. Radial bearings 75 are fixedly mounted in spindle 14 and pivotally support shaft 9. Preferably, these bearings are compliant foil bearings (e.g., Miller: U.S. Pat. No. 4,229,054) which are known to produce nearly frictionless operation at high rotational speeds without the introduction of externally pressurized oil or gas. However, one skilled in the art might select any one of a variety of well known ball and journal bearing types, including hydrostatic and hydrodynamic journal bearings. In this embodiment, the axial aerodynamic forces produced by the supersonic jet impinging on the fore-body and rotor are absorbed by the thrust disk 76 in cooperation with the spindle 14 which constitutes a thrust bearing. The thrust bearing preferably is of the compliant foil bearing type or the Rayleigh step type which are self-activating and therefore require no external oil or gas pressure. However, one skilled in the art might elect a conventional hydrostatic type of thrust bearing. In the preferred embodiment, the non-rotating spindle 14 is shaped aerodynamically so as to cooperate with the housing 11 in managing collection and diffusion processes of said second-fluid.

Figure 1:
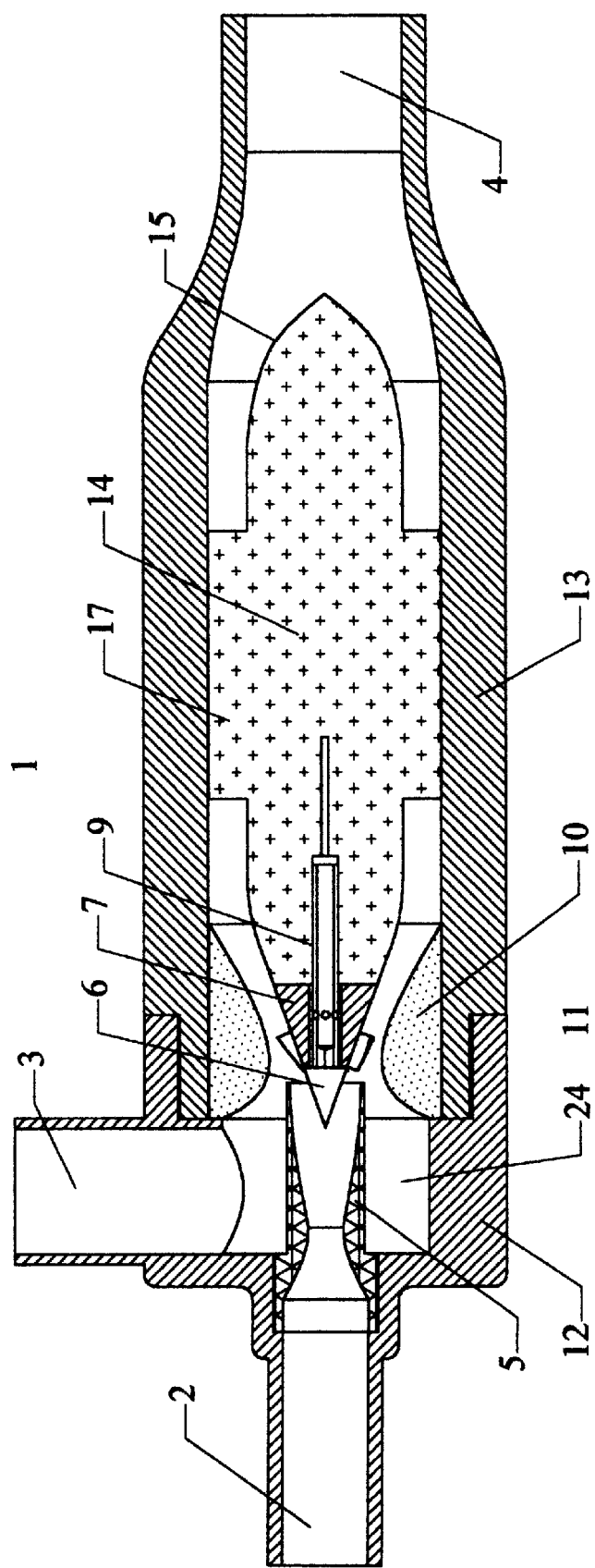
FIG. 1 is a longitudinal sectional elevation of an embodiment of a prior-art pressure-exchange ejector placing the rotor between an upstream conical fore-body and a downstream spindle.
Figure 2:
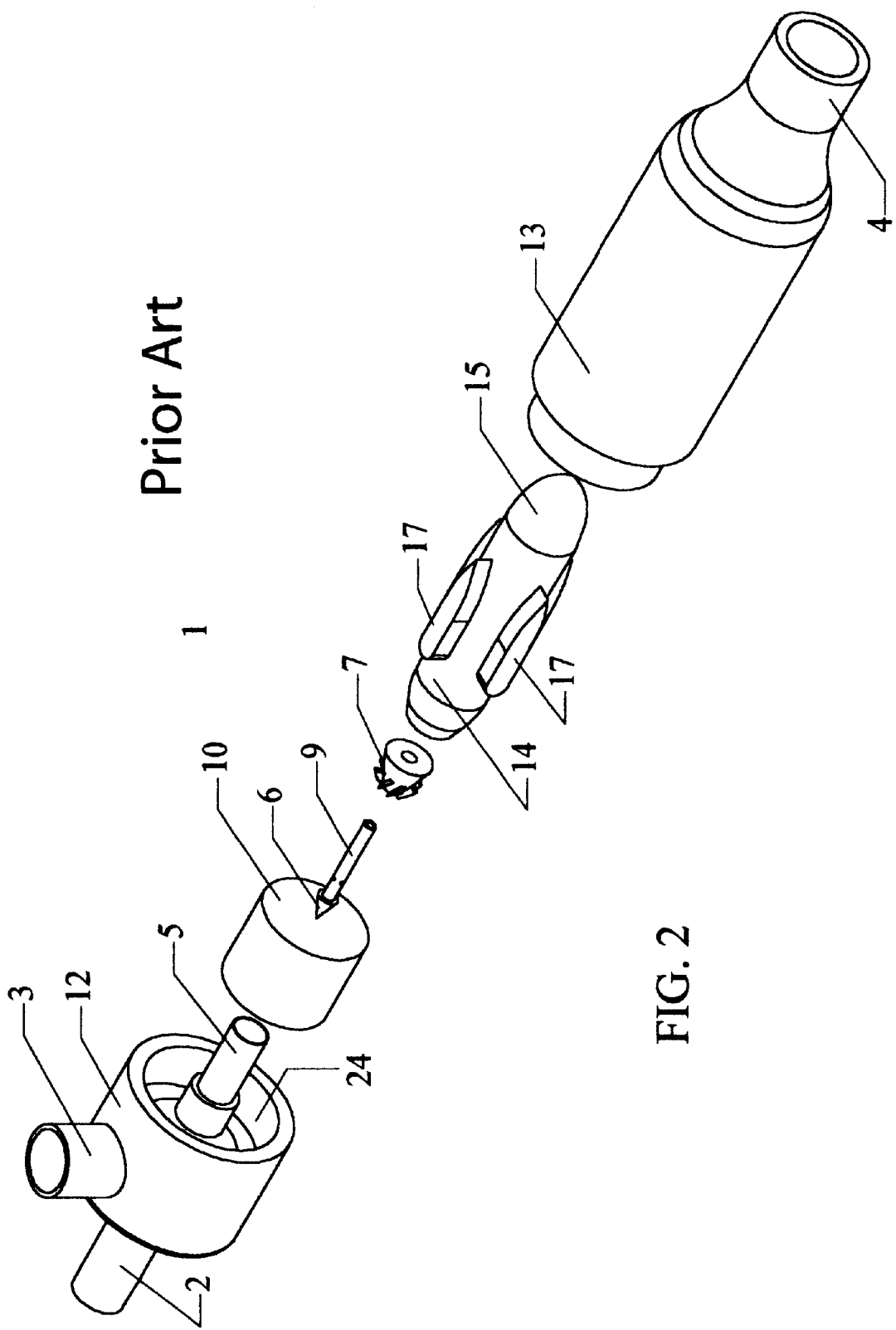
FIG. 2 is an exploded view of the embodiment of FIG. 1 showing each component.

For the embodiment of FIG. 23, the spindle 14 is rigidly and concentrically connected to the downstream section 13 of housing 11 by means of a plurality of struts 17 which radially extend from the substantially cylindrical body of said spindle 14 to the inner surface of said downstream housing section 13. The struts 17 are preferably aerodynamically shaped to minimize stagnation pressure losses in the flow of the fluid mixture around them, yet they must be wide and long enough and of sufficient number to provide a strong and rigid support for the spindle 14. A minimum of three struts is recommended, but one skilled in the art might require a greater number so as to provide the additional function of flow straightening. In the embodiment shown in FIG. 23, three struts were selected. In the embodiment of FIGS. 1 and 2, four struts were selected. Referring to FIG. 23, downstream of the struts 17, and integral with the rear portion of the spindle 14 is shown an aerodynamic diffuser 15 which, in cooperation with the aerodynamic surfaces of the housing downstream section 13, serves to further decelerate the second-fluid in a gradual manner so as to minimize stagnation pressure losses. In this particular embodiment, the aerodynamic diffuser 15 assumes the form of an afterbody to spindle 14. Further downstream of the aerodynamic diffuser 15 is the second-fluid outlet conduit 74 from the rear portion of the housing downstream section 13. From said secondary-fluid outlet conduit 74, the second-fluid discharges to its intended recipient application.

Important features of the disclosed pressure-exchange compressor-expander 70 include the fact that no complicated dynamic seals are necessary to separate the primary and secondary flows prior to pressure-exchange as is required in the prior art. Secondly, since the flow is supersonic over the surface 27 of the rotor 7, the static pressure is low, and the thrust loading is substantially lower than that experienced in the prior-art pressure-exchange compressor-expanders. Thirdly, since the rotor 7 is free-spinning, the stress on the vanes 18 is very low relative to conventional turbine vanes which must transmit substantial torque. This allows the rotor 7 to be made from ultra-high temperature materials which can sustain very high temperature primary fluids introduced through inlet conduit 2. Since for many applications the primary of the pressure-exchange compressor-expander 70 is a thermally energized fluid introduced through inlet conduit 2, the secondary, introduced through inlet conduit 3, would normally be at a much lower temperature. After the primary and secondary fluids experience pressure-exchange, the primary fluid, having undergone expansion, would normally drop substantially in temperature, while the secondary would increase in temperature, but not to the degree of the entering primary fluid. Hence, one skilled in the art could design this invention such that the shroud 10, the spindle 14, and all downstream components of the compressor-expander 70 could be reduced to a temperature substantially lower than that of the primary. Fourthly, since no radial sealing surfaces are needed, the difficulties of prior art pressure-exchange compressor-expanders in designing for the effects of thermal and centrifugal expansion of the rotor 7 are not encountered in the instant pressure-exchange compressor-expander 70. Fifthly, the invention can function very well with different working substances for the primary and secondary fluids. For example, some topping cycles call for a primary fluid of vaporized liquid metal and secondary fluid of helium. In other applications, steam may be the primary and air the secondary.

Figure 11:
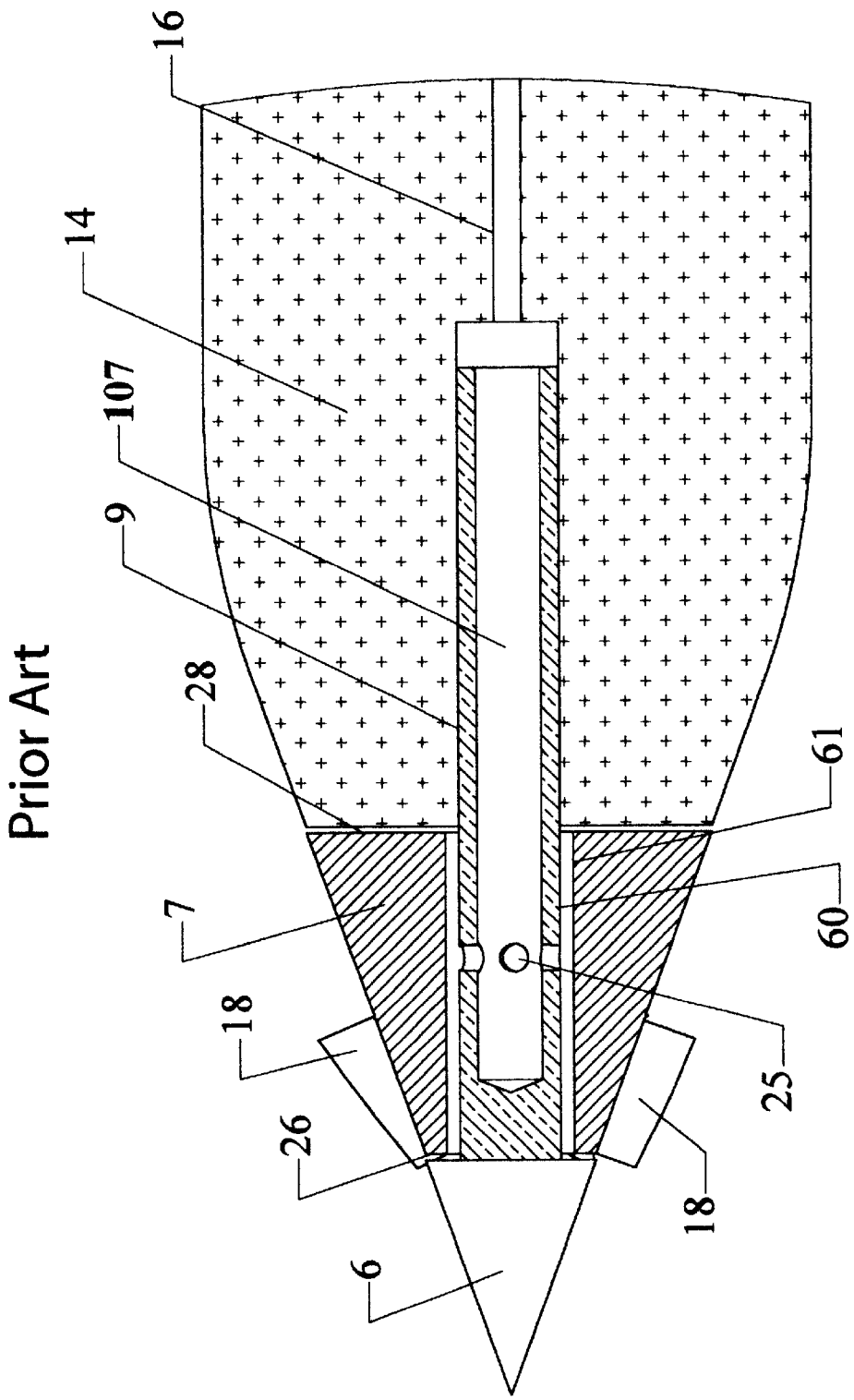
FIG. 11 shows a fluid radial bearing and thrust bearing arrangement for the embodiment of FIG. 1.

As a result of the supersonic primary fluid emanating from supersonic nozzle 5 and impinging on the rotor 7, a thrust loading in the axial downstream direction is placed on the rotor 7, which would tend to produce contact between rotor 7 and the adjacent components if no thrust bearing means were employed. For the embodiment shown in FIG. 23, said adjacent component would be the spindle 14. For other embodiments, adjacent components might include bearings, afterbodies, spacers, shims, and similar mechanical components. Since for most efficient operation of the compressor-expander, the rotor 7 should be substantially free-spinning, a thrust bearing is needed to provide a longitudinal clearance space between said rotor 7 and said spindle 14 and thereby minimize friction between them. There are several ways in which this could be accomplished. In one embodiment, the shaft 9 is stationary and angular contact ball bearings could be placed at the forward and rearward ends of rotor 7 such that the outer races of said bearings are captured by said rotor 7, while the inner races are fixed at appropriate positions on the shaft 9 so that longitudinal forces on the rotor 7 are transmitted through the bearings to the shaft 9 and then to the spindle 14. Still another embodiment would provide a pivotal mount of the rotor 7 on shaft 9 while a needle roller thrust bearing is placed between rotor 7 and shaft 9. In this embodiment, the longitudinal thrust imposed on rotor 7 is directly transferred to the spindle 14 through the intermediate needle roller thrust bearing. Still another embodiment would employ magnetic radial and thrust bearings to provide of a substantially frictionless pivotal connection between said rotor 7 and said spindle 14. One skilled in the art could apply variations on these embodiments to provide effective radial and thrust bearing means. Still another embodiment of a radial and thrust bearing for use in this invention is shown in FIG. 11 which employs both fluid thrust and radial bearings. This mode is considered the best for applications where the rotor is small and must be compact since the fluid bearings occupy very little space, and, for high temperature applications, the bearing fluid provides the additional function of cooling. In order to elucidate the operation of the invention, the bearing clearances shown in FIG. 11 are exaggerated. As seen in FIG. 11, shaft 9 is provided a concentrical bore 107 so as to allow the entry of bearing fluid which is provided through supply conduit 16. At a longitudinal location on said shaft 9 corresponding to a location between the upstream end 26 and downstream end 28 of rotor 7, a plurality of substantially radial apertures 25 are provided in the shaft 9 which provide flow passages for said bearing fluid between the concentric bore 107 and the periphery 60 of said shaft 9. The apertures are arranged axi-symmetrically so as to evenly distribute the bearing fluid around the periphery 60 of said shaft 9. A small radial clearance is provided between the periphery 60 of shaft 9 and the axial bore 61 of rotor 7, and the longitudinal movement of the rotor 7 is limited in the downstream direction by the spindle 14, and in the upstream direction by the fore-body cone 6, but is otherwise free to slide along as well as rotate about the shaft 9. The distance between the rear surface of fore-body cone 6 and the front surface of spindle 14 is greater than the longitudinal dimension of the rotor 7 by a small but positive amount so as to allow small clearances between the upstream end 26 of rotor 7 and the fore-body cone 6 and between the downstream end 28 of rotor 7 and the spindle 14. The clearances selected will vary with the diameter of the rotor 7, the supply pressure of the bearing fluid, and the bearing fluid used. It is expected, however, that a typical design would have axial clearances of from 0.0005" to 0.005", while radial clearances between exterior surface 60 of shaft 9 and axial bore 61 of rotor 7 would be 0.0005"–0.002". In operation, high pressure bearing fluid is provided from supply conduit 16 and is conducted through the concentric bore 107 of the shaft 9 to apertures 25. Upon passing through apertures 25, the bearing fluid enters the annular space between rotor 7 and shaft 9. The bearing fluid then divides into a first portion and a second portion. The first portion of said bearing fluid flows longitudinally in the upstream direction in said annular space towards the fore-body cone 6 and then, upon reaching the fore-body cone 6, is deflected radially and eventually exits into the primary fluid boundary layer at the periphery of the fore-body cone 6 and rotor 7 and mixes with said primary fluid. Said second portion of said bearing fluid flows longitudinally in the downstream direction in said annular space towards said spindle 14 and then, upon reaching said spindle 14, is deflected radially and eventually exits into the boundary layer of the combined primary and secondary fluids and mixes with said fluids. In this embodiment of the invention, the high pressure of the bearing fluid displaces the rotor 7 to an axial position along shaft 9 between the fore-body cone 6 and the spindle 14 which is approximately self-centering and provides the desired clearances. Furthermore, the high pressure bearing fluid maintains the rotor 7 in a concentric position relative to the shaft 9 with substantially axi-symmetric radial clearance. Experience has shown that if very small clearances are provided, the mass flow rate of bearing fluid needed to provide satisfactory running clearances is very small in comparison with the primary fluid mass flow rate, so that the direct injection of bearing fluid into the working fluid streams has little impact on the operation of the pressure-exchange compressor-expander 70. Since the bearing fluid is injected directly into the primary and secondary flow stream, it is desirable for the bearing fluid to be of the same substance as either the primary or secondary fluids, or of such composition that it can be easily separated. Since the rotor 7 is free-spinning and does not transmit any torque, the rotor 7 is generally of low mass. Furthermore, since the static pressure on the surface of the rotor is very low, the thrust loading requirement on the bearing is very modest. Hence, the bearing fluid can consist of a gas, or a vapor, or a liquid, or a combination. For the most frictionless operation, gas bearings have been seen to be the best. Gas bearings operated most satisfactorily when the rotor 7 is well balanced both statically and dynamically, and when the radial clearance between shaft 9 and rotor 7 are small. When the ratio of the radius of shaft 9 to the radial clearance between shaft 9 and the axial bore 61 of rotor 7 is 200, satisfactory performance has been observed. It has also been found that for free-spinning operation, the concentricity between the periphery 60 of shaft 9 and its concentric bore 107 must be precise to avoid binding of the rotor 7 against the shaft 9, and the apertures 25 must be axi-symmetrically spaced. Furthermore, since, after dividing, the second portion of bearing fluid directed towards and adjacent to the spindle 14 provides the resistance to thrust imposed upon the rotor 7 as a result of the supersonic primary fluid, in the best mode, more fluid should be provided to said second portion of bearing fluid. Hence, it is advantageous to place the apertures 25 at a position rearward of the longitudinal midpoint of the rotor 7. In some applications, it may be advantages to have more than one row of apertures 25 to better control the distribution of bearing fluid. Furthermore, if the rotor 7 is placed in contact with a high temperature primary fluid, the bearing fluid can be used for the dual purpose of providing cooling. In such applications, the clearances and aperture patterns may be modified so as to provide better cooling and liquid bearing fluids can be selected so as to vaporize and absorb the latent heat may be advantageous.

Figure 12:
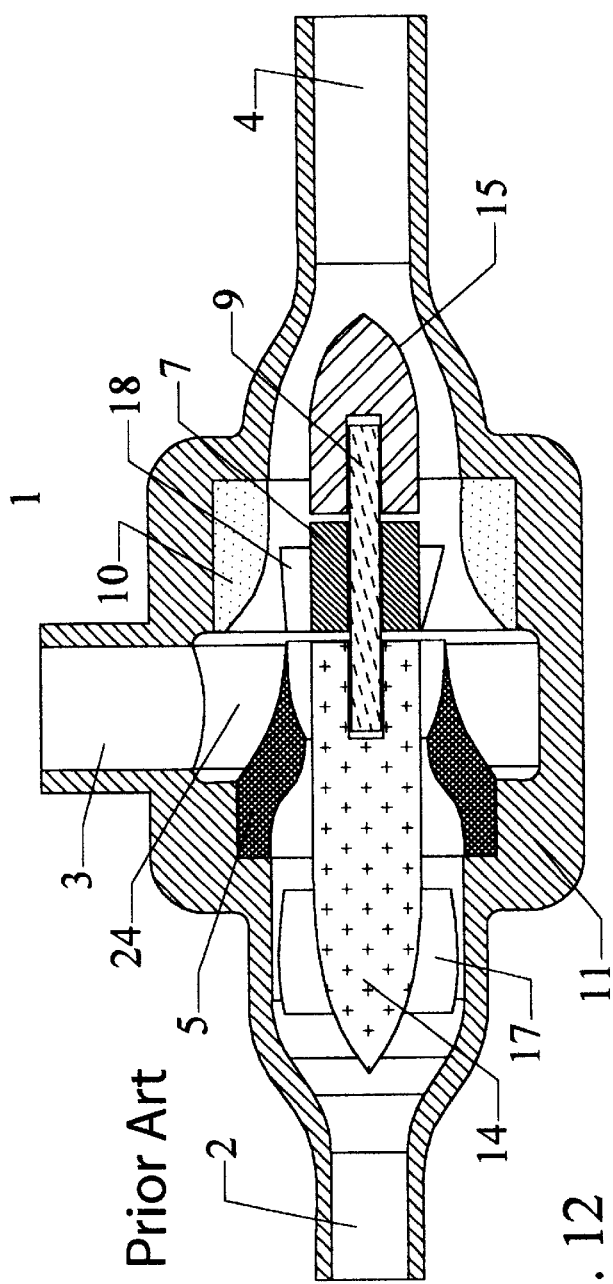
FIG. 12 is a sectional longitudinal view of a second embodiment of a prior-art pressure-exchange ejector whereby the spindle is located upstream of the supersonic nozzle and rotor and an aerodynamic diffuser is placed downstream.
Figure 13:
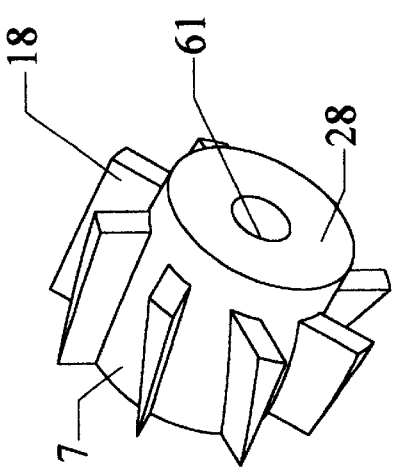
FIG. 13 shows an isometric view of a typical rotor as used in the embodiment of FIG. 12.

FIG. 12 shows a longitudinal sectional elevation of a second embodiment of the pressure-exchange ejector of the present invention. Pressure-exchange ejector 1 is enclosed by a housing 11 which provides a primary fluid inlet conduit 2 and a secondary fluid inlet conduit 3, a rigid support for supersonic nozzle 5, and a secondary fluid plenum 24. Said housing 11 further provides rigid support for aerodynamic shroud 10, rigid mount for the spindle 14, and a mixed-fluid outlet conduit 4. A compressible energetic primary fluid is introduced through said primary-fluid inlet conduit 2 and directed to converging-diverging supersonic nozzle 5 whereby the primary fluid is accelerated to supersonic speeds. The less energetic secondary fluid is introduced through secondary-fluid inlet conduit 3, passing through a plenum 24 which distributes the secondary fluid in an axi-symmetric manner around the exterior of supersonic nozzle 5 prior to being conducted downstream for pressure-exchange with the primary fluid. Immediately downstream of the supersonic nozzle 5 is a rotor 7 which is pivotally mounted so as to enable it to freely spin about the longitudinal axis of shaft 9. In the preferred embodiment shown, the shaft 9 is rigidly connected to the spindle 14 while the rotor is pivotally connected to the shaft 9. In other embodiments of this invention, the shaft 9 may be rigidly connected to the rotor 7, but pivotally connected to said spindle 14. As seen in FIG. 13 the body of the rotor 7 in this embodiment has the shape of a cylinder and whose surface is approximately contiguous with that of the adjacent spindle 14 so as to provide a smooth transitional flow path as the fluid progresses from the vicinity of the spindle 14 to the vicinity of the rotor 7. Upon the cylindrical surface of the rotor, a plurality of wedge-shaped vanes 18 are fixedly attached axi-symmetrically about the central longitudinal axis of rotor 7. The number of vanes 18 utilized can vary from two to a multitude, the number being determined by the pressure rise and mass flow ratio desired from the pressure-exchange ejector 1, as well as the diameter of the rotor 7. It is noted that in the preferred embodiment, the vanes 18 have a sharp leading edge and are characterized by a small wedge-angle 29. When the supersonic fluid stream passes over said canted vanes 18, free-spinning rotation is imparted to the rotor 7. An aerodynamic shroud 10 cooperates with said rotor 7 to direct said secondary flow into the vicinity of the primary flow so as to effect pressure-exchange. Downstream of said rotor 7 is placed an aerodynamic diffuser 15 which, in cooperation with the aerodynamic surfaces of the housing 11, serves to further decelerate the mixed fluid in a gradual manner so as to minimize stagnation pressure losses. In this particular embodiment, the aerodynamic diffuser 15 assumes the form of an afterbody. Further downstream of the aerodynamic diffuser 15 is the mixed-fluid outlet conduit 4 from the rear portion of the housing 11. From said mixed-fluid outlet conduit 4, the compressed mixture discharges and is directed by suitable piping to its intended recipient application.

As a result of the supersonic primary fluid emanating from supersonic nozzle 5 and impinging on the rotor 7, a thrust loading in the axial downstream direction is placed on the rotor 7, which would tend to produce contact between rotor 7 and adjacent components if no thrust bearing means were employed. The adjacent components in this embodiment are the spindle 14 and the aerodynamic diffuser 15. Since for most efficient operation of the ejector, the rotor 7 should be substantially free-spinning, a thrust bearing is needed to provide a longitudinal clearance space between said rotor 7 and adjacent components. There are several ways in which this could be accomplished as previously described.

Figure 27:
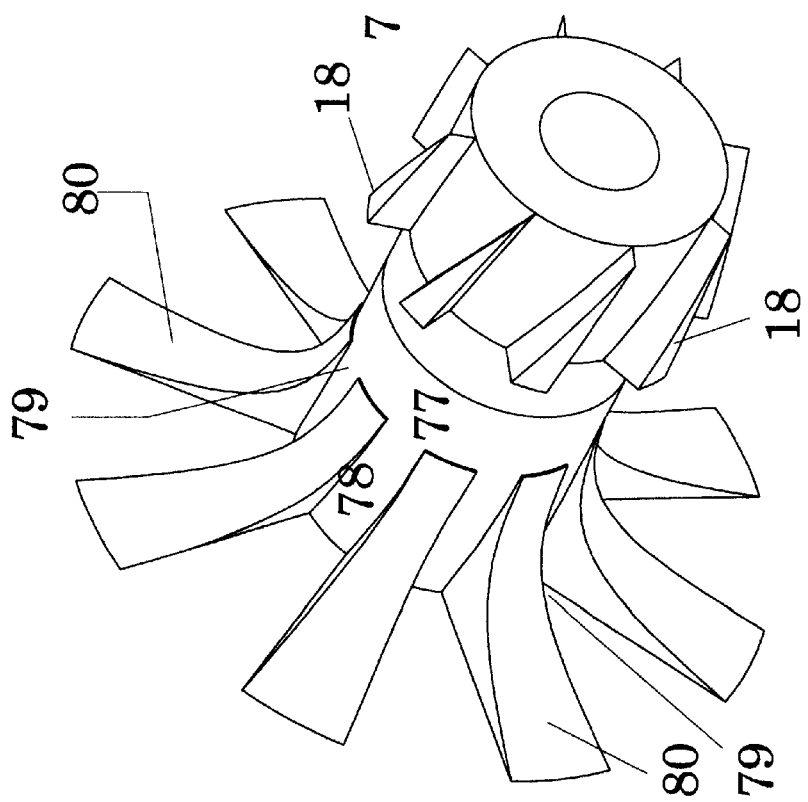
FIG. 27 is an embodiment of a rotor for use with a compressor-expander whereby the spindle is located upstream of the supersonic nozzle and rotor, showing vanes, pressure-exchange section, deflectors, and passages.

The pressure-exchange ejector 1 shown in FIG. 12 can easily be modified for use as a pressure-exchange compressor-expander 70 by use of a modified rotor 7 and inclusion of suitable discharge ports 71. An example of the rotor 7 for this embodiment of the present invention is shown in FIG. 27. The basic rotor is similar to that shown in FIG. 13, but an integral pressure-exchange section 77 of a length sufficient for completion of the pressure-exchange process is added, and a deflection section 78 is also added. As with the embodiment of FIG. 23, the deflector section 78 includes deflectors 80 and passages 79 for the counterpart fluid-stream which would selectively deflect proportions of the primary and the secondary fluid streams, depending on the election of the designer. Furthermore, as with the embodiment of FIG. 23, this embodiment of the present invention permits a predetermined amount of combining of primary and secondary fluids by the same means as previously described. One of ordinary skill in the art could easily modify the ejector housing of FIG. 12 to include a first-fluid extraction port 71, a first-fluid diffuser 105, a first-fluid discharge conduit 72, and a first-fluid outlet chamber 73.

Figure 17:
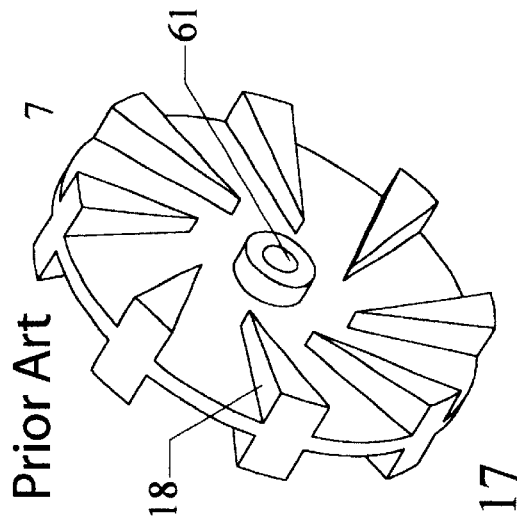
FIG. 17 shows a perspective view of a typical rotor as would be used in the embodiment of FIG. 14.
Figure 16:
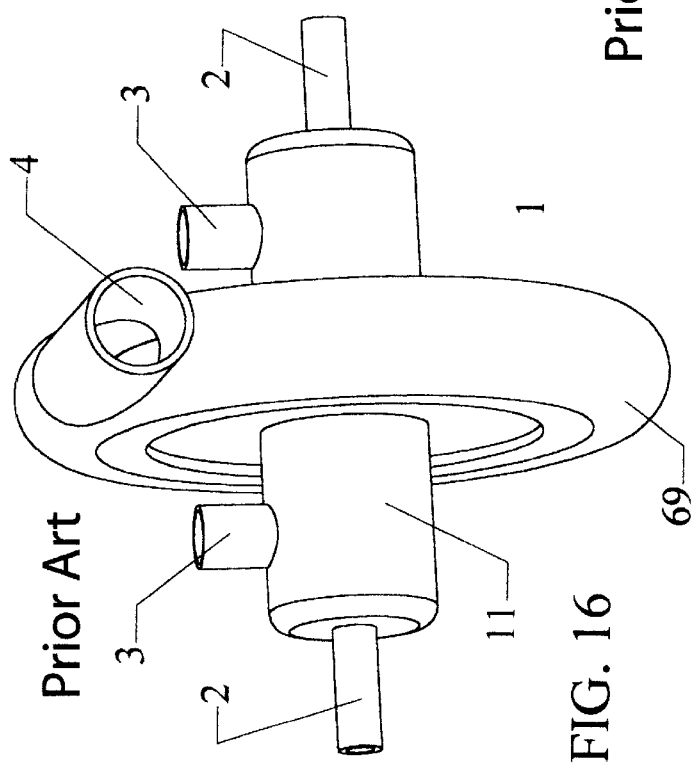
FIG. 16 shows and external view of the embodiment of FIG. 14.
Figure 18:
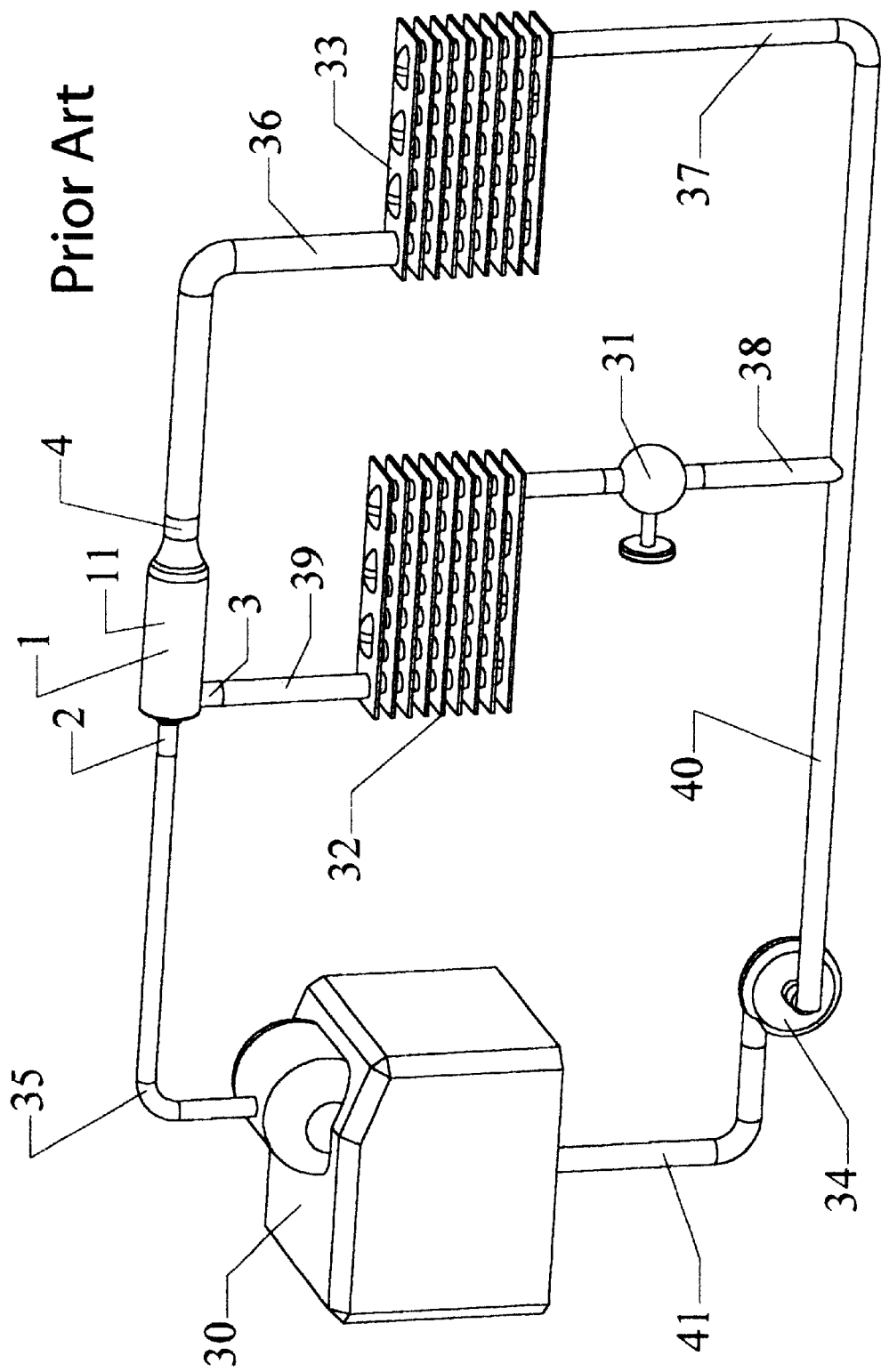
FIG. 18 shows an embodiment of an ejector refrigeration system utilizing the a prior-art pressure-exchange ejector.
Figure 19:
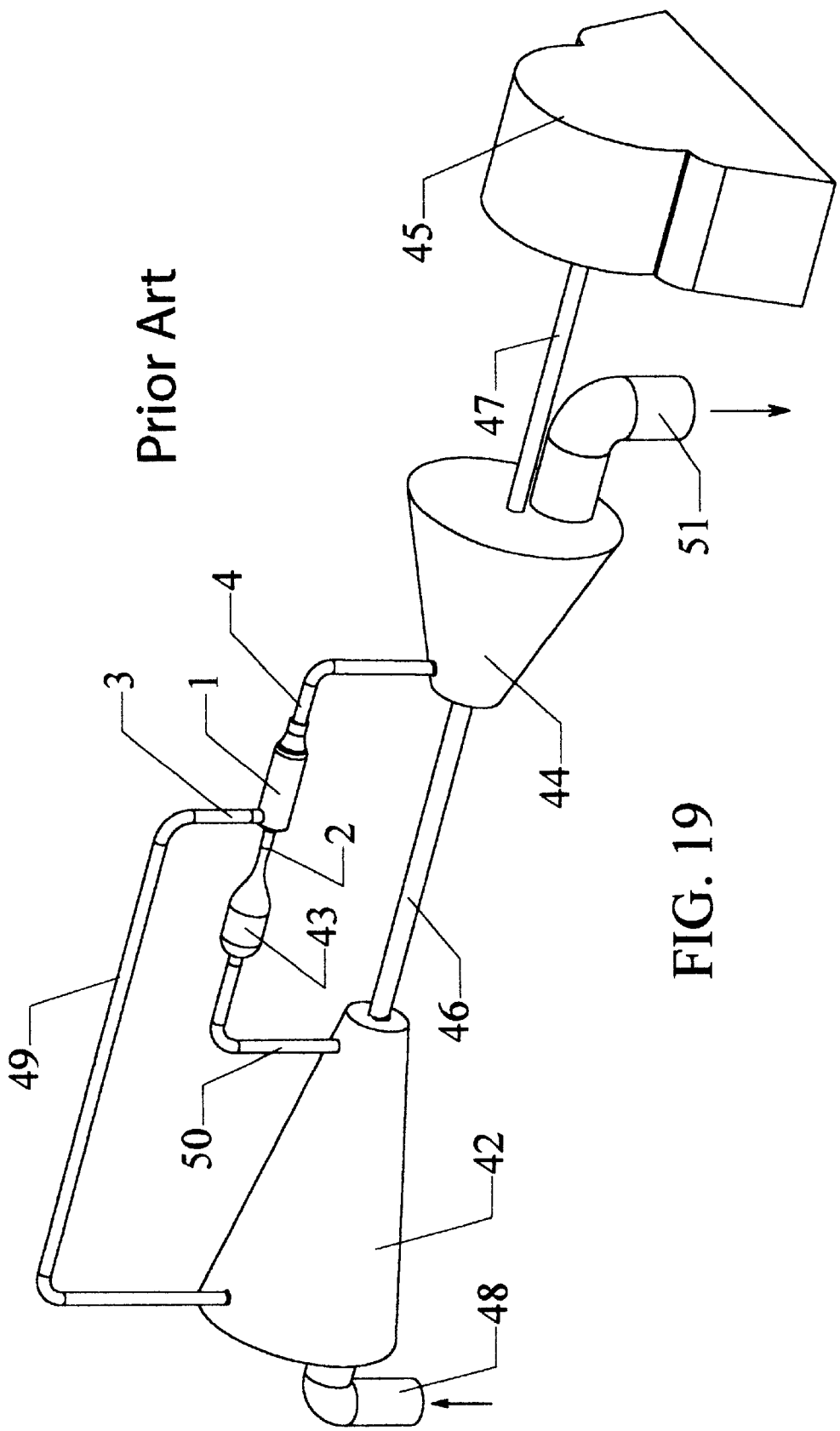
FIG. 19 shows an embodiment of a gas turbine topping cycle using a -prior-art pressure-exchange ejector.
Figure 20:
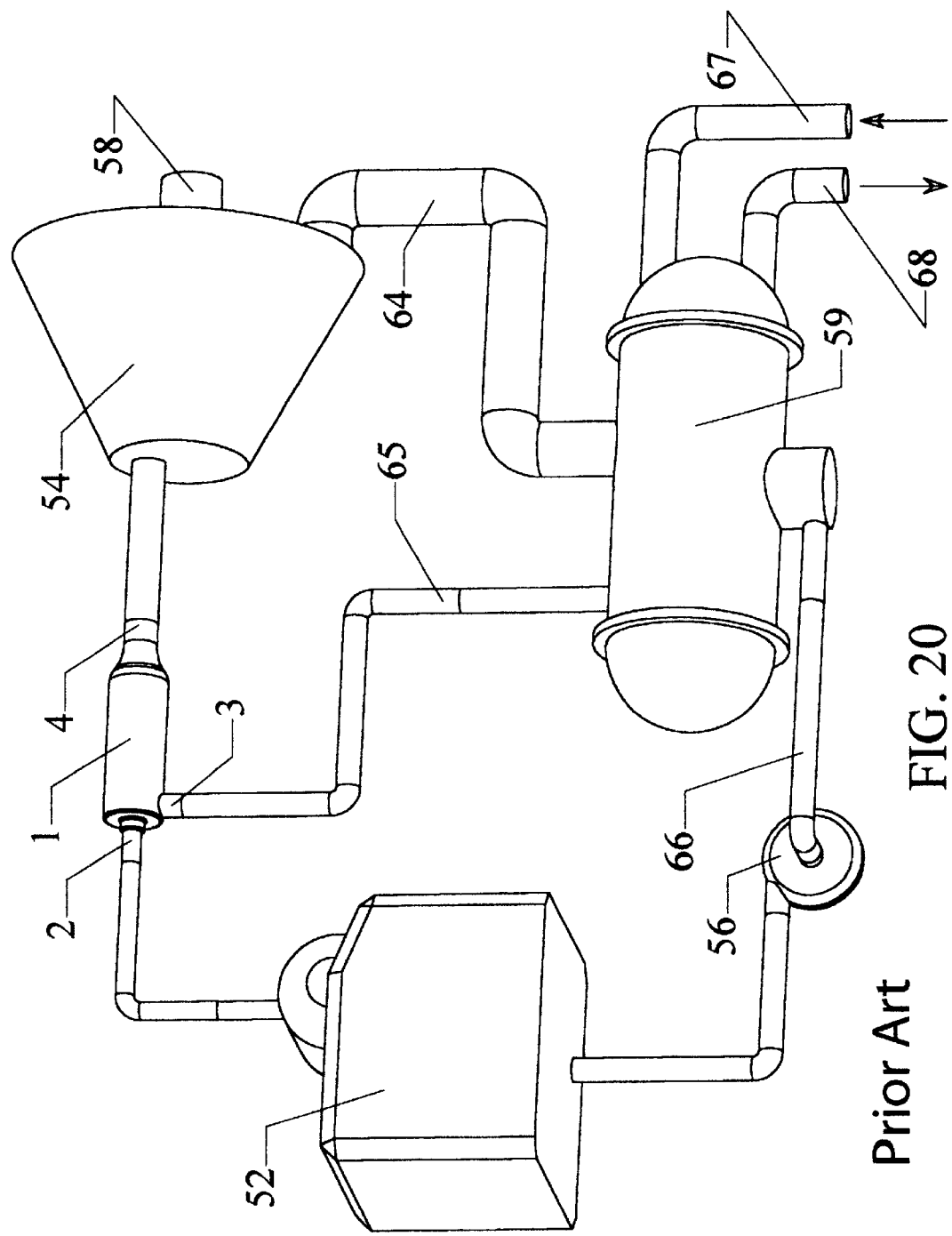
FIG. 20 shows an embodiment of a Rankine power cycle using a prior-art pressure-exchange ejector.

FIG. 14 shows a longitudinal sectional elevation of a third embodiment of the pressure-exchange ejector of the present invention. FIG. 15 shows a blow-up of the interaction zone region in the vicinity of the rotor for the same embodiment. FIG. 16 shows an external perspective view of this embodiment. For purposes of axial thrust minimization, this embodiment is shown in a dual-symmetric inlet configuration, however, with the use of thrust bearings as previously described, this embodiment can also be utilized with single inlets. Ejector 1 is enclosed by a housing 11 which provides a primary fluid inlet conduit 2 and a secondary fluid inlet conduit 3, a rigid support for supersonic nozzle 5, and a secondary fluid plenum 24. Said housing 11 further provides rigid support for aerodynamic shrouds 10, rigid mount for the spindle 14, and an outlet conduit 4 for the mixed fluid. A compressible energetic primary fluid is introduced through said inlet conduit 2 and directed to converging-diverging supersonic nozzle 5 whereby the primary fluid is accelerated to supersonic speeds. The less energetic secondary fluid is introduced through inlet conduit 3, passing through a plenum 24 which distributes the secondary fluid in an axi-symmetric manner around the exterior of supersonic nozzle 5 prior to being conducted downstream for pressure-exchange with the primary fluid. Immediately downstream of the supersonic nozzle 5 is a rotor 7 which is pivotally mounted so as to enable it to freely spin about the longitudinal axis of shaft 9. In the preferred embodiment shown, the shaft 9 is rigidly connected to the spindle 14 while the rotor is pivotally connected to the shaft 9. In other embodiments of this invention, the shaft 9 may be rigidly connected to the rotor 7, but pivotally connected to said spindle 14. As seen in FIG. 17 the body of the rotor 7 in this embodiment has the shape of a disk with a bearing hub whose surface is approximately contiguous with that of the adjacent spindle 14 so as to provide a smooth transitional flow path as the fluid progresses from the vicinity of the spindle 14 to the vicinity of the rotor 7. Upon the flat surfaces of the rotor, a plurality of wedge-shaped vanes 18 are fixedly attached axi-symmetrically about the central longitudinal axis of rotor 7. The number of vanes 18 utilized can vary from two to a multitude, the number being determined by the pressure rise and mass flow ratio desired from the pressure-exchange ejector 1, as well as the diameter of the rotor 7. It is noted that in the preferred embodiment, the vanes 18 have a sharp leading edge and are characterized by a small wedge-angle 29. When the supersonic fluid stream passes over said canted vanes 18, free-spinning rotation is imparted to the rotor 7. An aerodynamic shroud 10 cooperates with said rotor 7 to direct said secondary flow into the vicinity of the primary flow so as to effect pressure-exchange. Downstream of said rotor 7 is placed an aerodynamic diffuser 15 which serves to further decelerate the mixed fluid in a gradual manner so as to minimize stagnation pressure losses. In this particular embodiment, the aerodynamic diffuser 15 assumes the form of a classical radial-flow vaneless diffuser. Further downstream of the aerodynamic diffuser 15 is the mixed-fluid outlet conduit 4 from the peripheral portion of the housing 11 and which, in the present embodiment, has the form of a scroll 69. From said mixed-fluid outlet conduit 4, the compressed mixture discharges and is directed by suitable piping to its intended recipient application.

As a result of the supersonic primary fluid emanating from supersonic nozzle 5 and impinging on the rotor 7, a thrust loading in the axial downstream direction is placed on the rotor 7, which would tend to produce contact between rotor 7 and downstream components if no thrust bearing means were employed. Since for most efficient operation of the compressor-expander, the rotor 7 should be substantially free-spinning, a thrust bearing is needed to provide a longitudinal clearance space between said rotor 7 and adjacent components. There are several ways in which this could be accomplished as previously explained. However, in the present embodiment, the thrust loading can be eliminated by use of a dual-symmetric inlet configuration as shown. If the entire compressor-expander geometry is symmetrical with respect to the azimuthal plane of symmetry 104 of the rotor 7, and the primary fluid supply pressure at inlet conduits 2 is identical on both sides, and the secondary fluid supply pressure at inlet conduits 3 is identical on both sides, then there is virtually no axial thrust loading and no thrust bearing is needed.

Figure 28:
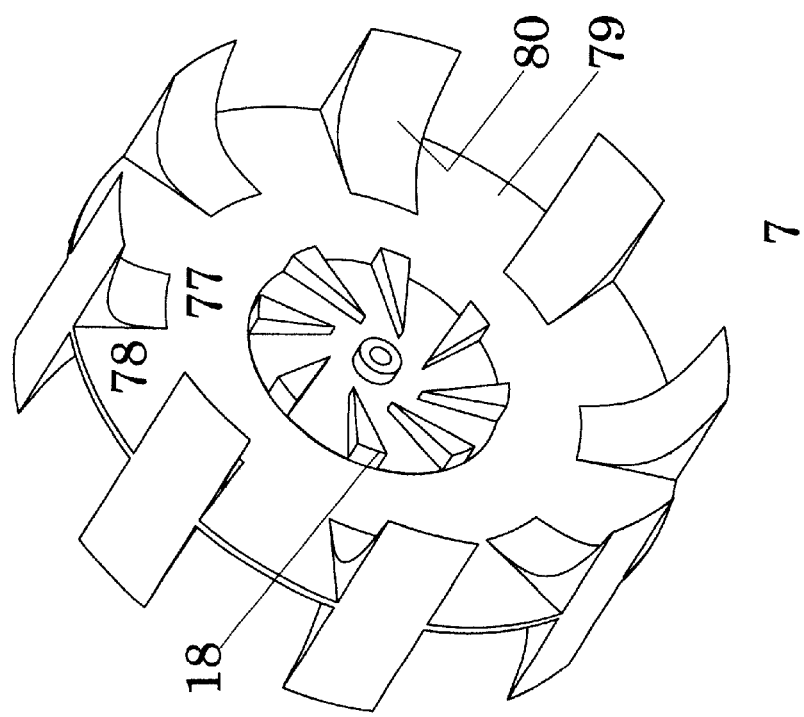
FIG. 28 is an embodiment of a rotor for use with a compressor-expander whereby the pressure exchange occurs in a radial configuration and axial thrust is eliminated by symmetric pressure balancing. Vanes, pressure-exchange section, deflectors, and passages are shown.

The pressure-exchange ejector 1 shown in FIG. 14 can easily be modified for use as a pressure-exchange compressor-expander 70 by use of a modified rotor 7 and inclusion of suitable first-fluid extraction ports 71. An example of the rotor 7 for this embodiment of the present invention is shown in FIG. 28. The basic rotor is similar to that shown in FIG. 17, but an integral pressure-exchange section 77 of a linear dimension sufficient for completion of the pressure-exchange process is added, and a deflection section 78 is also added. As with the embodiment of FIG. 23, the deflector section 78 includes deflectors 80 and passages 79 for the deflection of said first-fluid and the passage of said second-fluid. Furthermore, as with the embodiment of FIG. 23, this embodiment of the present invention permits one of ordinary skill in the art to control the predetermined proportion of primary and secondary fluids to be combined to form said first-fluid and said second-fluid by the same means as previously described. One of ordinary skill in the art could easily modify the ejector housing of FIG. 14 to include a first-fluid extraction port 71, a first-fluid diffuser 105, a first-fluid outlet conduit 72, and a first-fluid outlet chamber 73. For said second-fluid, second-fluid extraction port 106, second-fluid diffuser 15, second fluid outlet chamber 69, and second fluid outlet conduit 74 are present in the structure of FIG. 14 in said ejector 1.

Figure 29:
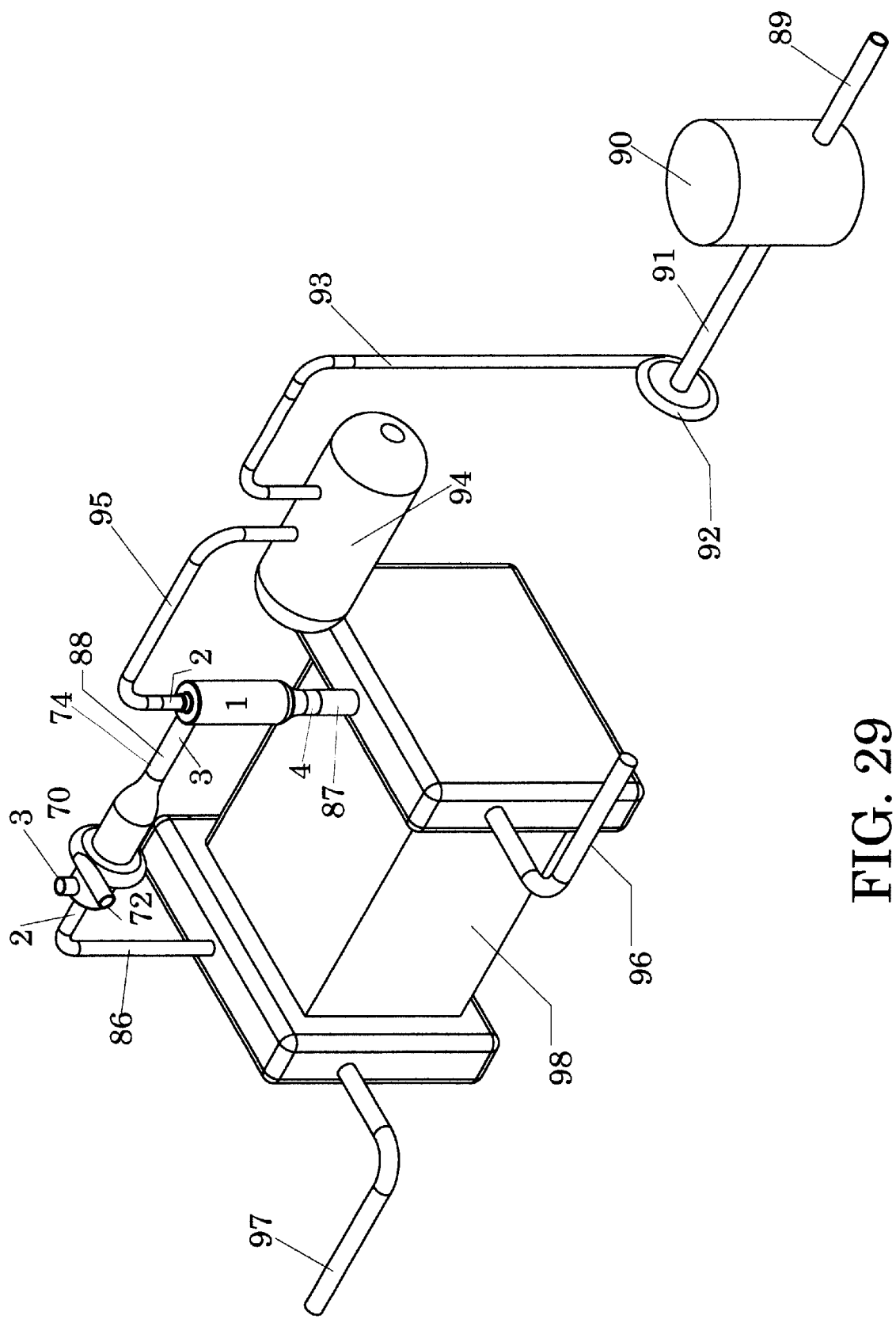
FIG. 29 discloses a fuel-cell pressurization system utilizing the pressure-exchange compressor-expander and a pressure-exchange ejector of the present invention in a two-stage arrangement.

The combination of the pressure-exchange ejector 1 and the pressure-exchange compressor-expander 70 of this invention is ideally suited for use in pressurizing and moisturizing environmentally friendly fuel-cell power generation systems (e.g., Kumar, U.S. Pat. No. 5,248,566). A basic embodiment of the use of this invention in such a system is illustrated in FIG. 29. The pressurization system is shown on the oxygen-side of the fuel cell 98, however, pressurization on the hydrogen-side is also anticipated by the current invention, particularly when partial oxidation reformers which require pressurized air to convert fuel to hydrogen are used. In the embodiment shown, the fuel-cell 98 is provided oxygen from the ambient air through secondary inlet conduit 3 of pressure-exchange compressor-expander 70. Pressurized oxygen-depleted but moisture rich exhaust from the oxygen-side of said fuel cell 98 is extracted through conduit 86 and is introduced into said pressure-exchange compressor-expander 70 through primary inlet conduit 2. The de-energized first-fluid is brought through outlet conduit 72 which discharges to the open atmosphere. The deflectors 80 and vanes 18 of said rotor 7 are azimuthally arranged so that second-fluid consists essentially of a major proportion of clean air, and a smaller proportion of recirculated, moisture-rich, primary fluid. Said second-fluid is discharged through outlet conduit 74 and is brought through conduit 88 to the secondary fluid inlet conduit 3 of pressure-exchange ejector 1. Pressure-exchange ejector 1 is energized with steam which is brought to primary inlet conduit 2 from boiler 94 through conduit 95. Said boiler 94 can be energized by electric heating elements, combustion, or waste heat from the reforming process or elsewhere. Liquid water is brought through conduit 89 from a water-management system to holding tank 90 from which pump 92 receives water through conduit 91 and discharges liquid water to boiler 94 through conduit 93. In pressure-exchange ejector 1, the mixture of the energized air and the de-energized steam are together discharged through outlet conduit 4 and brought to the oxygen-side of fuel cell 98 through conduit 87. Hydrogen-rich fuel, generally from a reformer, is introduced to the fuel cell 98 through conduit 96, and hydrogen-depleted products are discharged through conduit 97.

In this embodiment of the invention, two-stage operation can enable the attainment of a high pressure in the fuel cell 98. Five atmospheres would be quite reasonable. Furthermore, no heavy electric motors or conventional machinery are needed, thus saving appreciable weight, volume and cost . The compatibility with the steam energizing and the high moisture content required by proton-exchange-membrane fuel cells is particularly advantageous, although the system can be used with phosphoric acid fuel cells, molten carbonate fuel cells, solid oxide fuel cells, and others as well since all fuel cells can benefit from pressurization. By the use of controlled combining of primary and secondary flows as previously discussed, the system offers further accurate means of moisture control. Cold start-up for proton exchange membrane fuel cell vehicles can be accomplished by the use of electric heating elements in the boiler. The time required to build up pressure is governed by the design of the electrical boiler heating elements and the mass of water contained within boiler 94. However, with proper design, pressurization in less than one minute should be possible. It should also be noted that this embodiment of the invention can be used on the hydrogen side of the fuel cell as well where the presence of the energizing steam may be used in the reforming process.

Figure 30:
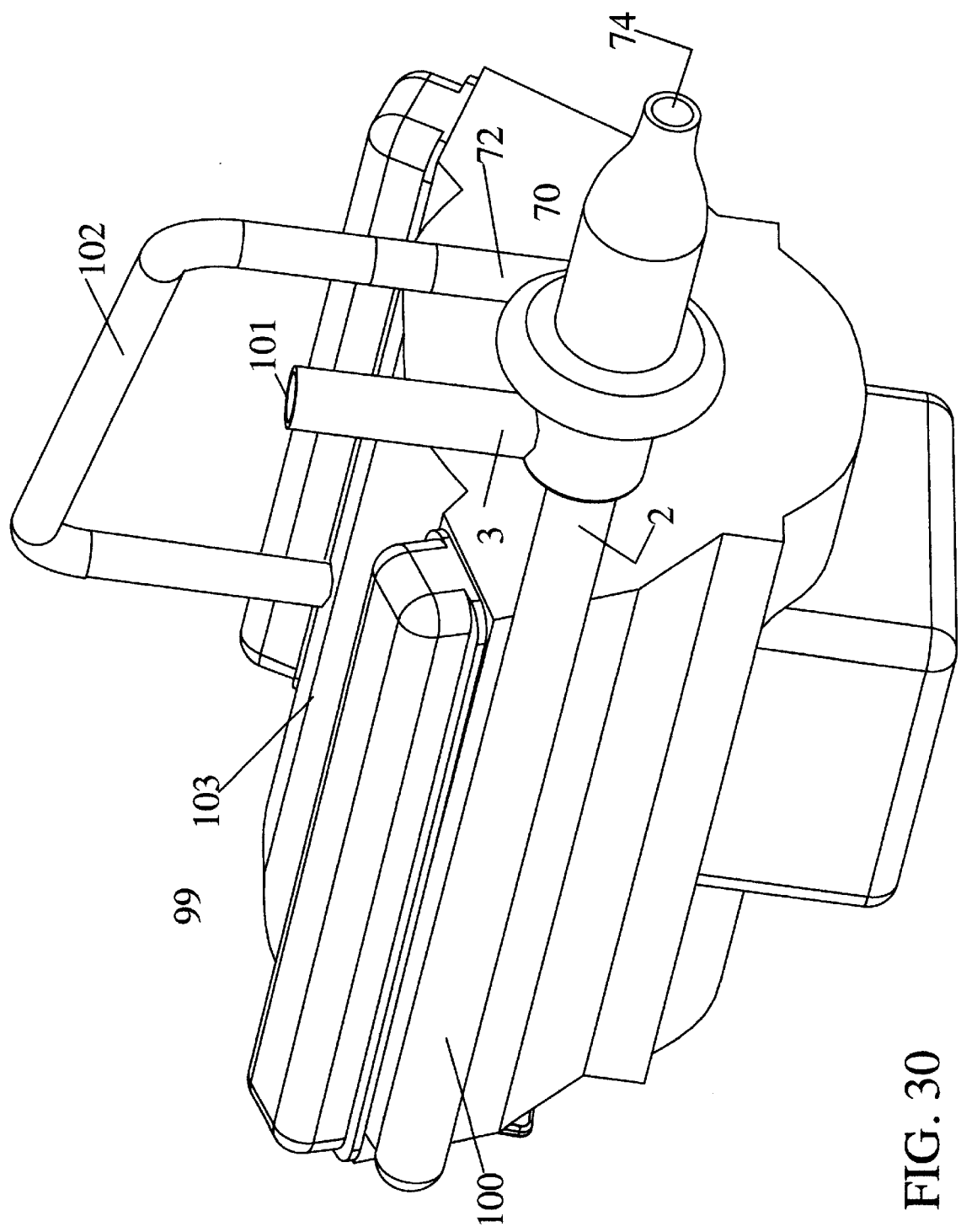
FIG. 30 discloses an application of the pressure-exchange compressor-expander of the present invention as a turbocharger for an internal combustion engine.

Another embodiment of this invention is shown in FIG. 30 whereby the pressure-exchange compressor-expander 70 is used in an internal combustion engine 99 as a turbo-charger. Energetic exhaust gases are taken from the engine through exhaust manifold 100 and introduced into compressor-expander 70 through primary inlet conduit 2. Clean air from the atmosphere is introduced to said compressor-expander 70 through conduit 101 to secondary fluid inlet conduit 3. In this embodiment, the rotor 7 has the azimuthal angular relationship between vanes 18 and deflectors 80 in such relationship that first-fluid, which is discharged through outlet conduit 72, is comprised essentially of a major proportion of clean air originating from said secondary fluid, and a lesser proportion of products of combustion originating from said primary fluid, the proportions determined by the amount of exhaust gas recirculation desired. Said first-fluid is thence conducted through conduit 102 to engine inlet manifold 103. Second fluid, which is comprised in major proportion of primary fluid, is directed to discharge conduit 74 whereupon it is directed to the exhaust system of the engine, ultimately being discharged to the ambient. This invention, due to the low stress level and the lack of high tolerances, permits high temperature robust operation, particularly if the rotor is made out of high temperature alloys or ceramic materials. Having only a single free-spinning rotor 7, the compressor-expander 70 of the present invention is considerably smaller, simpler, and lower in cost than conventional turbo-chargers. Furthermore, if compliant foil bearings are used, the problems of lubricating oil contamination that exist with conventional turbo-chargers do not exist.

Another embodiment of the current invention involves is use as an air-cycle heat pump. Referring to FIG. 24, compressed air is introduced through the primary fluid inlet conduit 2 of the pressure-exchange compressor-expander 70. In subsonic aircraft applications, said compressed air typically comes from the propulsion gas turbine engine by-pass from a compressor stage and is then cooled convectively in a heat exchanger with outside air. In supersonic aircraft, ram air is captured at a convenient place on the airframe, but convective cooling is not feasible due to the high stagnation temperature of the outside air. In industrial applications, the compressed air could come from any convenient source, including shop air. In an air-cycle heat pump application, one skilled in the art would design the compressor-expander 70 for maximum separation so that first-fluid and second-fluid each consist essentially of non-combined primary and secondary fluids. In passing through said compressor-expander 70, the primary fluid-stream 82 performs work on the secondary fluid stream 81 through the action of pressure-exchange. Let us consider an embodiment where said first-fluid consists essentially of primary fluid. (An alternate, equally excellent, embodiment would be such that said first-fluid consists essentially of secondary fluid). Then, the primary fluid is de-energized and leaves through outlet conduit 72 at a lower stagnation temperature than when it entered. It can therefore be utilized for cooling. Similarly, secondary fluid stream 81 is energized and leaves with a higher stagnation temperature than when it entered compressor-expander 70, and can therefore be utilized for heating. In this application, performance is best when an optimal separation arrangement is employed and when the separation is accomplished immediately after the pressure exchange phase to avoid combining of primary and secondary fluids. Even if combining is avoided, heat transfer between primary and secondary fluid steams must also be avoided. Referring to FIG. 26, although primary fluid-stream 82 and secondary fluid stream 81 are in direct contact during the pressure-exchange phase, due to their high velocities, the time in which a given particle of primary fluid mass is in contact with a counterpart particle of secondary fluid mass is extremely short and on the order of 100 microseconds. Thus, there is insufficient time for much heat transfer to take place between primary fluid stream 82 and secondary fluid stream 81. Thus, one of ordinary skill in the art can achieve excellent thermal performance by reducing mixing and heat transfer between contacting fluid streams 81 and 82 through careful design.

The invention claimed is:

1. A pressure-exchange compressor-expander (70) comprising:
   a housing (11); and,
   a primary fluid inlet conduit (2) incorporated into said housing (11); and,
   a secondary fluid inlet conduit (3) incorporated into said housing (11); and,
   a plenum (24) which is internal to said housing (11) and receives secondary fluid from said secondary fluid inlet conduit (3); and,
   a supersonic nozzle (5) fixedly mounted within said housing (11), receiving primary fluid from said primary fluid inlet conduit (2), and which accelerates said primary fluid to form a supersonic stream at the nozzle discharge, said nozzle discharge being surrounded by said plenum (24); and,
   an outlet conduit (72) for the discharge of a first-fluid; and,
   an outlet conduit (74) for the discharge of a second-fluid; and,
   a spindle (14) rigidly mounted to said housing (11); and,
   a rotor (7) pivotally connected to said spindle (14), said rotor (7) comprising an axi-symmetric revolute body and a plurality of canted vanes (18) fixed to said rotor (7), a pressure-exchange section (77) downstream of said vanes, and a deflection section (78) wherein a plurality of deflectors (80) are placed azimuthally relative to said vanes (18) so that fractions of said primary fluid and said secondary fluid are deflected, said fractions of said primary fluid and said secondary fluid in combination constituting said first-fluid, whereby said deflectors (80) are separated by passages (79), having proportions of said primary fluid and said secondary fluid not included in said first-fluid passing through said passages (79) and in combination constituting said second-fluid; and,
   an aerodynamic shroud (10) which receives said secondary fluid from said plenum (24) and directs said secondary fluid towards said primary fluid in the vicinity of said vanes (18) so as to affect pressure-exchange between said primary and secondary fluids in said pressure-exchange section (77); and,
   a first-fluid extraction port (71) which directs said first-fluid to said first-fluid outlet conduit (72); and,
   a second-fluid extraction port (106) which directs said second-fluid to said second-fluid outlet conduit (74).

2. A pressure-exchange compressor-expander (70) according to claim 1 wherein the number of deflectors (80) are equal to the number of vanes (18) and are azimuthally arranged so that said first fluid consists essentially of the primary fluid, and said second-fluid consists essentially of secondary fluid.

3. A pressure-exchange compressor-expander (70) according to claim 1 wherein the number of deflectors (80) are equal to the number of vanes (18) and are azimuthally arranged so that said first fluid consists essentially of the secondary fluid, and said second-fluid consists essentially of primary fluid.

4. A pressure-exchange compressor-expander (70) according to claim 1 wherein the number of deflectors (80) are not equal to the number of vanes (18) so as to produce controlled combination of said primary and said secondary fluids in said first-fluid and said second-fluid.

5. A pressure-exchange compressor-expander (70) according to claim 1 wherein said vanes have an acute leading edge facing said supersonic stream.

6. A pressure-exchange compressor-expander (70) according to claim 1 wherein a thrust bearing controls the axial clearances of said rotor and adjacent components.

7. A pressure-exchange compressor-expander (70) according to claim 6 whereby said adjacent components are selected from a group consisting of a fore-body (6), a spindle (14), a spacer, a bearing, a shaft, a plate, an afterbody, and an aerodynamic diffuser (15).

8. A pressure-exchange compressor-expander (70) according to claim 1 wherein said rotor is fabricated from a material selected from the group consisting of ceramics, aluminum alloys, titanium alloys, magnesium alloys, nickel alloys, molybdenum alloys, tungsten alloys, alloy steels, plastics, and fiber composites.

9. A pressure-exchange compressor-expander (70) according to claim 1 wherein an aerodynamic diffuser (105) controls the pressure recovery process of said first-fluid.

10. A pressure-exchange compressor-expander (70) according to claim 1 wherein an aerodynamic diffuser (15) controls the pressure recovery processes of said second-fluid.

11. A pressure-exchange compressor-expander (70) according to claim 1 wherein said spindle (14) is an axi-symmetric body of revolution rigidly connected to said housing by means of a plurality of radial struts (17) so arranged as to allow the passage of fluid around said spindle (14).

12. A pressure-exchange compressor-expander (70) according to claim 6 wherein said thrust bearing is provided comprising a cylindrical shaft (9) which includes an axial bore (70) for the supply of pressurized bearing fluid, a plurality of radial apertures (25) communicating from said axial bore (70) of said shaft (9) to its periphery (60), said radial apertures (25) placed axi-symmetrically at a longitudinal location within said axial cylindrical bore in said rotor (61), said bearing fluid being supplied through a suitable conduit in said spindle (16), and discharged into said primary and secondary fluids through a path including axial flow in both upstream and downstream directions between the periphery of said shaft (60) and said first axial bore in said rotor (61) and radial flows in the longitudinal clearances between upstream and downstream ends of said rotor (7) and adjacent components.

13. A pressure-exchange compressor-expander (70) according to claim 12 wherein said bearing fluid consists of a substance selected from the group consisting of the primary fluid substance and the secondary fluid substance.

14. A pressure-exchange compressor-expander (70) according to claim 1 wherein the molecular weight of said primary fluid is different from molecular weight of said secondary fluid.

15. A pressure-exchange compressor-expander (70) according to claim 1 wherein said rotor (7) is placed downstream of an acuminate revolute fore-body (6) and upstream of said spindle (14), said fore-body (6) substantially coaxial with said supersonic nozzle (5) and placed with apex directly facing into said supersonic stream.

16. A pressure-exchange compressor-expander (70) according to claim 1 wherein said rotor (7) is placed downstream of said spindle (14).

17. A pressure-exchange compressor-expander (70) according to claim 1 wherein: said rotor (7) having an azimuthal plane of symmetry (104), said rotor (7) having an axis of rotation perpendicular to said azimuthal plane (104), and with a plurality of vanes (18) whose chords lie substantially parallel to said azimuthal plane; and, said housing (11) substantially symmetric about said azimuthal plane (104); and, said primary fluid inlet conduit (2), said secondary fluid inlet conduit (3), said supersonic nozzle (5), said aerodynamic shroud (10), said plenum (24), and said spindle (14) being duplicated symmetrically about said azimuthal plane (104).

18. A pressure-exchange compressor-expander (70) according to claim 1 wherein said first-fluid extraction port (71) is placed in aerodynamic correspondence with the downstream portion of said deflectors (80) so as to capture said first-fluid.

19. A pressure-exchange compressor-expander (70) according to claim 1 wherein saidsecond-fluid extraction port (106) is placed in aerodynamic correspondence with the downstream portion of said passages (79) so as to capture said second-fluid.

20. A pressure-exchange compressor-expander (70) according to claim 18 wherein: an aerodynamic diffuser (105) is placed downstream of said extraction port (71) to diffuse said first-fluid.

21. A pressure-exchange compressor-expander (70) according to claim 19 wherein: an aerodynamic diffuser (15) is placed downstream of said extraction port (106) to diffuse said second-fluid.

22. In a method of diffluentially compressing a secondary fluid, the steps of:
1. conducting an energetic compressible primary fluid to the primary fluid inlet conduit (2) of a pressure-exchange compressor-expander housing (11);
2. accelerating said primary fluid through a supersonic nozzle (5) to Mach numbers in excess of one to form a supersonic stream;
3. passing said supersonic primary fluid over a plurality of canted vanes (18) with acute leading edges, said vanes being fixedly mounted on a free-spinning rotor (7);
4. forming vane-shocks and expansion fans over each vane (18);
5. conducting a secondary fluid to the secondary fluid inlet conduit (3) of a pressure-exchange compressor-expander housing (11) and thence to a plenum (24) inside said housing (11) and surrounding the exterior of said supersonic nozzle (5);
6. directing said secondary fluid so as to engage with said vane-shocks and expansion fans to affect pressure-exchange between said primary and secondary flows;
7. after pressure-exchange has completed to a predetermined level, deflecting a first-fluid by means of deflectors (80) and allowing second-fluid to pass through passages (79) located between said deflectors (80).

23. A method of diffluentially comprising a secondary fluid according to claim 22 wherein after undergoing pressure-exchange, azimuthal positions of said deflectors (80) are coordinated with the respective azimuthal positions of said vanes (18) so that said first-fluid consists essentially of said primary fluid and said second-fluid consists essentially of said secondary fluid.

24. A method of diffluentially compressing a secondary fluid according to claim 22 wherein after undergoing pressure-exchange, azimuthal positions of said deflectors (80) are coordinated with the respective azimuthal positions of said vanes so that said first-fluid consists essentially of said secondary fluid and said second-fluid consists essentially of said primary fluid.

25. A method of diffluentially compressing a secondary fluid according to claims 23 or 24 wherein the number of vanes (18) are equal to the number of deflectors (80).

26. A method of diffluentially compressing a secondary fluid according to claim 22 wherein said primary fluid is of different molecular weight than said secondary fluid.

27. A method of diffluentially compressing a secondary fluid according to claim 22 wherein after undergoing pressure-exchange, the number of said deflectors (80) are greater or less than the number of said vanes (18) so that said first-fluid and said second-fluid each consist essentially of a predetermined combinations of primary fluid and secondary fluid.

28. A fuel cell (98) pressurization system comprising:
1. A fuel cell (98);
2. a compressor-expander (70) according to claim 1;
3. an ejector (1);
4. A steam boiler (94);
wherein, pressurized and energetic products of reaction from said fuel cell (98) are conducted through a conduit (86) to the primary fluid inlet conduit (2) of said compressor-expander (70) wherein said primary fluid is de-energized and discharged from the system, said primary fluid imparting its energy on a reactant-rich secondary fluid which is introduced to said compressor-expander (70) through secondary fluid inlet conduit (3) and thereafter compressed in said compressor-expander (70) and discharging into an ejector (1) through a secondary fluid inlet conduit (3), said ejector (1) being energized by steam conducted to the primary fluid inlet conduit (2) and provided by a boiler (94); said reactant-rich secondary fluid being further pressurized in said ejector (1) and having the mixture of the steam primary fluid and the reactant rich secondary fluid discharged through an outlet conduit (4) into the fuel cell (98).

29. A fuel cell (98) pressurization system in accordance with claim 28 whereby said ejector (1) is a pressure-exchange ejector.

30. A fuel cell (98) pressurization system in accordance with claim 28 whereby said reactant rich secondary fluid is air.

31. A fuel cell (98) pressurization system in accordance with claim 28 whereby said reactant rich secondary fluid is reformate.

32. A fuel cell (98) pressurization system in accordance with claim 28 wherein said fuel cell (98) is selected from a group consisting of proton exchange membrane fuel cells, phosphoric acid fuel cells, molten carbonate fuel cells, and solid oxide fuel cells.

33. A method of pressurizing a fuel cell comprising the steps of:
1. extracting pressurized products of reaction from said fuel cell (98); and, 2. conducting said pressurized products through a conduit (86) to the primary fluid inlet conduit (2) of a compressor-expander (70) according to claim 1; and, 3. de-energizing said primary fluid in said compressor-expander (70) and discharging it from the system; and, 4. conducting to said compressor-expander (70) through secondary fluid inlet conduit (3) reactant rich fluid; and, 5. imparting the energy lost by said primary fluid to said secondary fluid in said compressor-expander (70); and, 6. conducting said reactant-rich secondary fluid from said compressor-expander (70) to the secondary fluid inlet (3) of an ejector (1); and, 7. providing energy to said ejector (1) by conducting pressurized steam through primary inlet conduit (2) of said ejector (1); and, 8. discharging pressurized mixture of said reactant-rich secondary fluid and steam into said fuel cell (98).

34. A method of fuel cell (98) pressurization in accordance with claim 33, whereby said ejector (1) is a pressure-exchange ejector.

35. A method of turbo-charging an internal combustion engine (99) comprising the steps of:

1. extracting pressurized products of combustion from said internal combustion engine (99); and, 2. conducted said products of combustion through an exhaust manifold (100) to the primary fluid inlet conduit (2) of a pressure-exchange compressor-expander (70) in accordance with claim 1; and, 3. de-energizing said primary fluid in said compressor-expander (70) and discharging it to the exhaust system; and, 4. conducting to said compressor-expander (70) through secondary fluid inlet conduit (3) oxygen-rich gas; and, 5. imparting the energy lost by said primary fluid to said secondary fluid in said compressor-expander (70); and, 6. conducting said secondary fluid from said compressor-expander (70) to the intake manifold (103) of said internal combustion engine (99).

36. A method of air-cycle refrigeration comprising the steps of:

1. extracting pressurized air from a source; and, 2. conducting said pressurized air to the primary fluid inlet conduit (2) of a pressure-exchange compressor-expander (70) in accordance with claim 1; and, 3. de-energizing said primary fluid in said compressor-expander (70) and discharging it to the space requiring cooling; and, 4. conducting fresh air to said compressor-expander (70) through secondary fluid inlet conduit (3); and, 5. imparting the energy lost by said primary fluid to said secondary fluid in said compressor-expander (70); and, 6. discharging said secondary fluid from said compressor-expander (70) to the outside.

37. A method of air-cycle refrigeration according to claim 36 whereby said source of pressurized air is by-pass air from a compressor-stage of a gas-turbine engine.

38. A method of air-cycle refrigeration according to claim 37 having the additional step of rejecting heat from the pressurized air prior to introduction in said compressor-expander (70).

39. A method of air-cycle refrigeration according to claim 36 whereby said source of pressurized air is ram-air from the exterior of an aircraft.

* * * * *